United States Patent
Lemasters

(10) Patent No.: US 9,155,425 B2
(45) Date of Patent: Oct. 13, 2015

(54) NUT OPENING DEVICE

(71) Applicant: Travis J. Lemasters, Austin, TX (US)

(72) Inventor: Travis J. Lemasters, Austin, TX (US)

(*) Notice: Subject to any disclaimer, the term of this patent is extended or adjusted under 35 U.S.C. 154(b) by 0 days.

(21) Appl. No.: 14/347,587

(22) PCT Filed: Sep. 27, 2012

(86) PCT No.: PCT/US2012/057628
§ 371 (c)(1),
(2) Date: Mar. 26, 2014

(87) PCT Pub. No.: WO2013/049396
PCT Pub. Date: Apr. 4, 2013

(65) Prior Publication Data
US 2014/0215831 A1    Aug. 7, 2014

Related U.S. Application Data

(60) Provisional application No. 61/596,857, filed on Feb. 9, 2012, provisional application No. 61/539,941, filed on Sep. 27, 2011.

(51) Int. Cl.
*A47J 43/26*    (2006.01)

(52) U.S. Cl.
CPC ........................................ *A47J 43/26* (2013.01)

(58) Field of Classification Search
CPC ...... A47J 43/26; B26B 27/007; A47G 21/062
USPC ................................................ 30/120.2, 298
See application file for complete search history.

(56) References Cited

U.S. PATENT DOCUMENTS

| 263,917 A | 9/1882 | Kdoeae |
| 467,364 A | 1/1892 | Breen |
| 885,569 A | 4/1908 | Bergquist |
| 971,186 A | 9/1910 | Freitag |
| 1,000,226 A | 8/1911 | Arwine |
| 1,028,667 A * | 6/1912 | Billau ............................ 30/298 |

(Continued)

FOREIGN PATENT DOCUMENTS

CH          12054 A      10/1896
WO    WO-2013049396 A1    4/2013

OTHER PUBLICATIONS

"Chef'n. Palm Brush", http://www.mightyape.com.au/product/Chefn-Palm-Brush-Apricot/18385947/, (<website visited on Sep. 21, 2011>), 7 pgs.

(Continued)

*Primary Examiner* — Hwei C Payer
(74) *Attorney, Agent, or Firm* — Schwegman Lundberg & Woessner, P.A.

(57) ABSTRACT

A culinary nut opening device can include a mount and a tool. The mount can be sized and shaped to securely and removably receive a finger or a thumb of a human user. The tool can extend from and be coupled to a portion of the mount. In varying examples, the tool can include a pick portion that is sized and shaped to fit at least partially within an opening of a culinary nut and have sufficient stiffness to allow the culinary nut to be pried open. A pick portion can extend ventrally, laterally, or dorsally from a side of the mount, or from a distal end of the mount. A culinary nut opening device can be provided with or packaged in a container of culinary nuts, or with other culinary nut opening devices (e.g., of different sizes), or with instructions for use.

24 Claims, 31 Drawing Sheets

(56) References Cited

U.S. PATENT DOCUMENTS

| | | | | |
|---|---|---|---|---|
| 1,444,976 | A | * | 2/1923 | Mandley .................... 30/298 |
| 1,506,928 | A | | 9/1924 | Hansen et al. |
| 2,380,186 | A | * | 7/1945 | Mayer .................... 15/236.05 |
| 2,461,524 | A | * | 2/1949 | Cook .................... 30/120.2 |
| D162,924 | S | | 4/1951 | Becherer |
| 2,704,889 | A | | 3/1955 | Delinanos |
| 2,776,592 | A | | 1/1957 | Di Preta |
| 2,788,817 | A | | 4/1957 | Leniz |
| 3,074,449 | A | | 1/1963 | Mikulas |
| 3,648,558 | A | | 3/1972 | Chenette |
| 3,650,172 | A | | 3/1972 | Osborne |
| 3,699,838 | A | | 10/1972 | Montgomery |
| 4,127,222 | A | | 11/1978 | Adams |
| 4,177,698 | A | | 12/1979 | Greneker |
| 4,239,134 | A | | 12/1980 | Joy |
| 4,257,287 | A | | 3/1981 | Dawson |
| 4,292,705 | A | * | 10/1981 | Stouffer .................... 15/110 |
| 4,317,281 | A | | 3/1982 | Yowa |
| D263,917 | S | | 4/1982 | McCulley |
| 4,330,894 | A | | 5/1982 | Hayden |
| 4,339,878 | A | | 7/1982 | Tozzi |
| 4,462,156 | A | | 7/1984 | Himelhoch |
| 4,497,237 | A | | 2/1985 | Beall |
| 4,825,728 | A | | 5/1989 | Mitchell |
| 5,068,941 | A | * | 12/1991 | Dunn .................... 15/167.1 |
| 5,803,322 | A | | 9/1998 | Boone et al. |
| 5,973,243 | A | | 10/1999 | Christenson |
| 6,012,165 | A | * | 1/2000 | Cain .................... 2/21 |
| 6,726,068 | B2 | * | 4/2004 | Miller .................... 223/101 |
| 7,036,262 | B2 | | 5/2006 | Yabusaki |
| 7,162,827 | B1 | | 1/2007 | Yabusaki |
| 7,234,192 | B2 | * | 6/2007 | Barbar .................... 15/167.1 |
| 7,421,787 | B2 | | 9/2008 | White et al. |
| D615,304 | S | * | 5/2010 | Cole et al. .................... D4/103 |
| 7,743,690 | B2 | | 6/2010 | White et al. |
| 2005/0235496 | A1 | | 10/2005 | Shagday et al. |
| 2008/0066321 | A1 | | 3/2008 | Vallero |
| 2009/0038159 | A1 | | 2/2009 | White et al. |
| 2009/0139384 | A1 | | 6/2009 | Bramucci |
| 2010/0042229 | A1 | | 2/2010 | Hawk |
| 2014/0215831 | A1 | * | 8/2014 | Lemasters .................... 30/120.2 |
| 2014/0259694 | A1 | * | 9/2014 | Oldham .................... 30/298 |

OTHER PUBLICATIONS

"Finger Monster Puppets", http://www.childtherapytoys.com/store/product5400.html, (<website visited on Sep. 21, 2011>), 1 pgs.

International Application Serial No. PCT/US2012/057628, International Preliminary Report on Patentability mailed Dec. 5, 2013, 5 pgs.

International Application Serial No. PCT/US2012/057628, Search Report mailed Nov. 22, 2012, 4 pgs.

International Application Serial No. PCT/US2012/057628, Written Opinion mailed Sep. 20, 2013, 5 pgs.

International Application Serial No. PCT/US2012/057628, Written Opinion mailed Nov. 22, 2012, 4 pgs.

"Rubber Finger Cots Assortment of 4 Sizes—12 Pcs", http://www.esslinger.com/rubberfingercotsassortmentof4sizes-12pcs.aspx, (<website visited Sep. 21, 2011>), 2 pgs.

"Rubber Finger Tips", http://www.alibaba.com/product-gs/361499989/Rubber_Finger_Tips/showimage.html, (<website visited Sep. 21, 2011>), 2 pgs.

"Silicone Finger Cap", http://www.alibaba.com/product-gs/214181835/Silicone_finger_cover/showimage.html, (<website visited on Sep. 21, 2011>), 1 pg.

"Silicone finger cover", http://www.alibaba.com/product-gs/222646437/silicone_finger_cover/showimage.html, (<website visited Sep. 21, 2011>), 2 pgs.

"Silicone finger ring", http://www.alibaba.com/product-gs/322361570/silicone_finger_ring.html, (<website visited Sep. 21, 2011>), 2 pgs.

"Silicone finger toothbrush", http://www.bambinipronto.com.au/Product-silicone-finger-toothbrush-974.aspx, (<website visited on Sep. 21, 2011>), 2 pgs.

* cited by examiner

NUT OPENING DEVICE

CLAIM OF PRIORITY

This patent application is a U.S. National Stage Filing under 35 U.S.C. 371 from International Application No. PCT/US2012/057628, filed on 27 Sep. 2012, and published as WO 2013/049396 A1 on Apr. 4, 2013, which claims the benefit of priority of (1) U.S. Provisional Patent Application Ser. No. 61/539,941 filed on Sep. 27, 2011, and of (2) U.S. Provisional Patent Application Ser. No. 61/596,857, filed on Feb. 9, 2012, each of which is herein incorporated by reference in its entirety, and the benefit of priority of each of which is claimed herein.

BACKGROUND

Culinary nuts can include botanical nuts as well as seeds or fruit that, in cuisine, can be regarded as nuts. A culinary nut can include a nutshell carrying a nutmeat or fruit (collectively "nutmeat") in the nutshell. Some culinary nuts, for example, pistachios, can include a dehiscent opening, but the nutshell can still be difficult to pry apart to extract the nutmeat from within the nutshell. Some culinary nuts do not include a natural dehiscent opening and the opening process can be initiated by a nutcracker or the like. Yet, even after use of the nutcracker, the nutshell can still be difficult to pry apart. When the nutshell has been pried apart, it can be difficult to then grab a hold of and extract the nutmeat from the pried-apart nutshell.

U.S. Design Patent No. 263,917 to McCulley, which was filed on Mar. 10, 1980 and issued on Apr. 20, 1982, illustrates a nut picking device. U.S. Pat. No. 4,462,156 to Himelhoch, which was filed on Oct. 26, 1981 and issued on Jul. 31, 1984, illustrates a pistachio nut opening device. U.S. Pat. No. 4,177,698 to Grenecker, which was filed on Mar. 24, 1978 and issued on Dec. 11, 1979, illustrates a finger fit implement. U.S. Pat. No. 1,506,928, which was filed on Jan. 6, 1923 and which issued on Sep. 2, 1924 illustrates a knife. U.S. Patent Publication No. 2009/0038159 A1 to White et al., which was filed on Sep. 5, 2008 and which published on Feb. 12, 2009, illustrates a thumb utensil with cutting board. U.S. Pat. No. 4,339,878 to Tozzi, which was filed on Oct. 20, 1980, and which issued on Jul. 20, 1982, illustrates a device for cutting flowers, fruit and the like.

OVERVIEW

The present inventor has recognized, among other things, that the de-shelling of culinary nuts can present a series of hassles and problems. Pistachios provide an illustrative example. Consumers can cut or irritate their fingers or thumbs, break their fingernails or thumbnails, or chip their teeth trying to open pistachio nutshells. Pistachios are expensive, so customers can be displeased when faced with the option of having to throw away a handful of pistachios because they cannot easily be opened. Even if a pistachio can be opened, a consumer can develop a sore finger or thumb from the sharp edges of a pistachio nutshell repeatedly pressing against the skin. Further, salt covering pistachio nutshells can irritate skin under a fingernail or thumbnail. A consumer can develop irritation and sensitive fingernails and thumbnails from prying open pistachio nutshells.

The present inventor has also recognized that finger or thumb-wearable devices can help address the above noted hassles and problems, along with providing other potential advantages.

This Overview is intended to provide non-limiting examples of the present subject matter—it is not intended to provide an exclusive or exhaustive explanation. The Detailed Description below is included to provide further information about the present devices, methods, and kits.

BRIEF DESCRIPTION OF THE DRAWINGS

In the drawings, which are not necessarily drawn to scale, like numerals can be used to describe similar elements in different views. Like numerals having different letter suffixes can be used to represent different instances of similar elements. The drawings illustrate generally, by way of example, but not by way of limitation, various embodiments discussed in the present document.

DETAILED DESCRIPTION

In 2003, the United States Department of Agriculture's Economic Research Service valued annual pistachio production in the United States at over $400 million. Frequently, pistachios are sold in-shell.

The present inventor has recognized that many consumers find de-shelling pistachio and other nuts problematic, which can decrease consumption. Unassisted acts of de-shelling pistachio nuts, for example, can result in irritated fingers or thumbs, broken fingernails or thumbnails, or chipped teeth. The present inventor has further recognized that by increasing the ease through which pistachios and other culinary nuts can be opened, purchasers will likely consume more culinary nuts.

New devices, methods, and kits associated with minimizing discomfort and frustration in the opening of culinary nuts are disclosed in this patent document. More particularly, this document discloses, among other things, finger or thumb-wearable culinary nut opening devices, related methods, and related kits, which can help avoid or solve some of the hassles encountered by a user opening a culinary nut having a shell.

Figure 1:
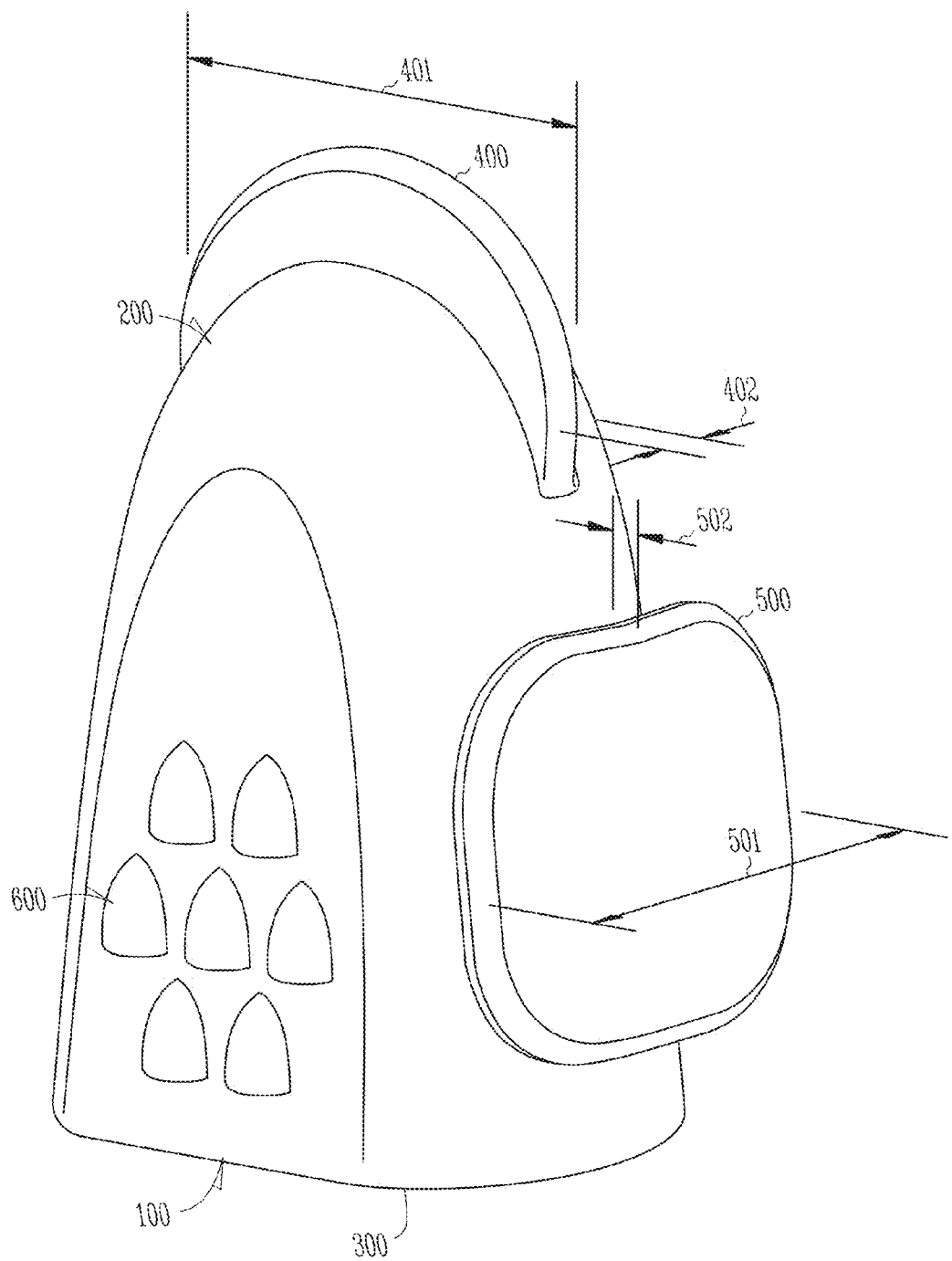
FIG. 1 illustrates a front isometric view of a finger or thumb-wearable culinary nut opening device.

FIG. 1 shows an example of a finger or thumb-wearable culinary nut opening device. Among other things, the nut opening device can include a mount extending from a proximal end 100 to a distal end 200. At the proximal end 100, the mount can include a proximal opening 300. The proximal opening 300 can be sized, shaped, or otherwise configured to fit a finger or thumb of a user. For example, the mount of the nut opening device can be configured to fit over a distal end of the finger or thumb of the user and be advanced to the first knuckle relative to the finger's or thumb's distal end. In this way, all or most of the distal portion of the finger or thumb can be seated against or otherwise located within an inner cavity of the mount when the nut opening device is worn by the user.

For example, the proximal 100 and distal 200 ends can be configured to form a substantially thimble-shaped mount. The thimble-shaped mount can be substantially circular or elliptical in cross-section and can be sized to have a circumference suitable for housing one of an adult male finger or thumb, an adult female finger or thumb, or a child finger or thumb. The thimble-shaped mount can optionally be configured to house a fingernail or thumbnail of the user, which can extend beyond the distal end of the finger or thumb, such as may be the style of fingernail as is sometimes particularly popular with a female user. The configuration suitable for housing the fingernail or thumbnail of the user can include an extension of the mount, or a tool extending from the mount, within which the fingernail can reside. The configuration need not completely house the fingernail or thumbnail of the user; it can include an open configuration in which the fingernail can slide through an opening in the mount.

One or both of (1) the proximal opening 300 or (2) the inner cavity of the mount can optionally be sized, shaped, or otherwise configured to inhibit rotation of the mount about the user's finger or thumb, such as when the nut opening device is being used to pry open a nutshell, e.g., by rotating the finger with respect to the nutshell, or vice-versa. Inhibiting rotation of the mount relative to the finger or thumb can optionally be accomplished or assisted by providing an elastically deformable, textured, shape-memory, tacky, or "grippy" region on an inner surface of the mount. For example, a rubber or silicone material can be used as either the mount itself, or as a relatively softer insert portion that can be located on the inner surface of a relatively harder mount portion, such as for allowing conformal seating against the user's finger tip or thumb tip. Such a softer insert can be user-detachable from the mount, or can be permanently coupled to the mount. Rotational inhibition of the mount with respect to the finger or thumb can also be achieved or assisted by configuring the proximal opening 300 of the mount to not be symmetrical in all directions. For example, instead of providing a mount with a circular lateral cross section (which is circularly symmetrical in all directions in the cross-sectional lateral plane orthogonal to a longitudinal axis of the finger or thumb carrying the mount), a non-circular cross-section, such as an oval-shaped or elliptical-shaped or racetrack-outlined-shaped or other lateral cross-section that can avoid symmetry in all directions, e.g., of the proximal opening or inner cavity, can be provided inhibit a mount's tendency to rotate about the user's finger or thumb during nut opening use.

The mount can be a unitary piece made from one or more than one material, such as different materials having the same or different degrees of hardness or stiffness. All or part of the inner cavity of the mount can include a material (e.g., elastic, rubber, plastic, cotton, foam, cotton, or silicone, or a thermoplastic) that can be relatively softer or more elastically deformable than the relatively harder material of the outer portion of the mount. This can help provide a comfortable, conforming fit to the user's finger tip or thumb tip, or can help to help inhibit rotation of the mount about the user's finger or thumb, such as during nut opening. This can be accomplished by treating (e.g., coating) at least a portion of the inner cavity of the mount, or by including a separate insert into the inner cavity of the mount, for example.

One or more portions of the nut opening device can be made of a hard plastic, metal, or any other material of suitable stiffness to allow prying open a culinary nut, such as via a dehiscent opening of the culinary nut. For example, the nut opening device can be made from a thermoplastic material. The thermoplastic polymer can include, but is not limited to, one or more of the following: acrylonitrile butadiene styrene (ABS), acrylic (polymethyl-methacrylate or PMMA), celluloid, cellulose acetate, cyclic olefin copolymer (COC), ethylene-vinyl acetate (EVA), ethylene vinyl alcohol (EVOH), fluoroplastics (such as polytetrafluoroethylene (PTFE), fluoroethylenepropylene (FEP), perfluoroalkoxy (PFA), chlorotrifluoroethylene (CTFE), ethylene chlorotrifluoroethylene (ECTFE), ethylene tetrafluoroethylene (ETFE)), ionomers, KYDEX (a trademarked acrylic/PVC alloy), liquid crystal polymer (LCP), polyoxymethylene (POM or acetal), polyacrylates (acrylic), polyacrylonitrile (PAN or acrylonitrile), polyamide (PA or nylon), polyamide-imide (PAT), polyaryletherketone (PAEK or ketone), polybutadiene (PBD), polybutylene (PB), polybutylene terephthalate (PBT), polycaprolactone (PCL), polychlorotrifluoroethylene (PCTFE), polyethylene terephthalate (PET), polycyclohexylene dimethylene terephthalate (PCT), polycarbonate (PC), polyhydroxyalkanoates (PHAs), polyketone (PK), polyester, polyethylene (PE), polyetheretherketone (PEEK), polyetherketoneketone (PEKK), polyetherimide (PEI), polyethersulfone (PES), chlorinated polyethylene (CPE), polyimide (PI), polylactic acid (PLA), polymethylpentene (PMP), polyphenylene oxide (PPO), polyphenylene sulfide (PPS), polyphthalamide (PPA), polypropylene (PP), polystyrene (PS), polysulfone (PSU), polytrimethylene terephthalate (PTT), polyurethane (PU), polyvinyl acetate (PVA), polyvinyl chloride (PVC), polyvinylidene chloride (PVDC), and styrene-acrylonitrile (SAN).

When the thermoplastic includes an ABS, the material can include a CYCOLAC® GPM5500F resin or GPPC ABS D-150. When the material is CYCOLAC® GPM5500F, the density can be approximately 1.05 g/cm$^3$ when using the ISO® 1183 standard test method. The melt mass-flow rate (MFR) at 220° C./10.0 kg can be approximately 24 g/10 min when using the ISO® 1133 standard test method. The melt volume-flow rate (MVR) at 220° C./10.0 kg can be approximately 24.0 cm$^3$/10 min when using the ISO® 1133 standard test method. The tensile modulus can be approximately 2400 MPa when using the ISO® 527-2/1 standard test method. The flexural modulus can be approximately 2300 MPa when using the ISO® 178 standard test method. The flexural strength can be approximately 70.0 MPa when using the ISO® 178 standard test method. The Rockwell hardness (R-scale) can be approximately 110 when using the ISO® 2039-2 standard test method. When the material is GPPC ABS D-150, the specific gravity can be approximately 1.05 g/cm$^3$ when using the ASTM® D792 standard test method. The melt mass-flow rate (MFR) at 200° C./5.0 kg can be approximately 2.3 g/10 min. when using the ASTM® D1238 standard test method. The flow molding shrinkage can be approximately 0.30% to 0.60% when using the ASTM® D955 standard test method. The tensile strength can be approximately 49.0 when using the ASTM® D638 standard test method. The flexural modulus can be approximately 2450 MPa when using the ASTM® D790 standard test method. The flexural strength can be approximately 78.3 MPa when using the ASTM® D790 standard test method. The Rockwell hardness (R-scale) can be approximately 112 when using the ISO® 2039-2 standard test method.

The nut opening device can be fully or partially formed using one or more of molding, injection molding, or the like. Injection molding can include using a first mold, a second mold, and a trimming member.

The mount can optionally include a closed or substantially closed distal end 200. A tool 400 can extend from the distal end 200 of the mount. The tool 400 can be made of the same material as a portion of the mount, or the tool 400 can be made of a material that differs from that of the mount. For example, when the tool 400 is made of a material that differs from that of the mount, the tool 400 can be made from a material that is more firm or more stiff than the material of the mount.

The tool 400 can optionally include a pick portion that can extend distally outward from the distal end 200 of the mount. The tool 400, and specifically the pick portion, can provide a lever or other means for applying enough torque (e.g., via a twisting or flexing of the wrist) such as for prying open a nut shell, such as a pistachio. The tool 400 can include a pick portion that can be sized, shaped, or otherwise configured to fit at least partially within an opening of a culinary nut, such as within the dehiscent opening of a pistachio. The pick or tool 400 can optionally be substantially arcuate in profile, such as when viewed from a palm-side of the user's hand, such as is shown in FIG. 1. The pick or tool 400 can be substantially square or rectangular in profile, such as when viewed from elevation relative to the longitudinal axis of the finger or thumb upon which the mount can be seated. The pick or tool 400 can be sized, shaped, disposed, or otherwise configured so as to allow a user to open a culinary nut, such as while substantially or completely avoiding damage to nutmeat within the nut shell. The pick or tool 400 can extend outward from the distal end 200 of the mount at a perpendicular or non-perpendicular angle to a plane tangent to the distal tip of the tool (e.g., to a lateral plane extending orthogonal to a longitudinal central axis of the finger or thumb upon which the mount can be placed). When the pick or tool 400 extends outward from the distal end 200 of the mount at such a non-perpendicular angle to said lateral tangent plane, the angle can be, for example, approximately 85°, approximately 80°, approximately 75°, approximately 70°, approximately 65°, approximately 60°, approximately 55°, approximately 50°, approximately 45°, approximately 40°, approximately 35°, approximately 30°, approximately 25°, approximately 20°, approximately 15°, approximately 10°, or approximately 5°, or within a range that includes one or more of the above angles. The pick or tool 400 can have a single lateral edge or a bilateral edge.

The nut opening device can additionally or alternatively include one or more tools 500 that can be located on a side surface of the mount. For example, the tool 500 can extend laterally outward from the side of the mount. The tool 500, such as explained above with respect to the tool 400, can include a pick portion, such as for applying torque such as for prying open a nut shell. The tool 500 can extend outward from any side portion of the mount, for example, from a side portion facing ventrally toward the palm of the user's hand, from a side portion laterally facing another finger or thumb, from a side portion facing dorsally away from the palm of the user's hand, or from a portion intermediate between any two of such above-listed portions.

The tool 500 can include a base. The tool 500 can include a portion that can extend unilaterally or bilaterally outward from the base. For example, the tool 500 can include a bilaterally-extending appendage (e.g., pick portion) extending from the base, which, in turn, can extend laterally from the mount, such as shown in the example of FIG. 1. The tool 500 can include the base, and can have a unilateral appendage, a bilateral appendage, or no appendage at all—in which case, for example, the base can act as the pick portion. The tool 500 can provide a shape that can be selected from a variety of shapes, such as substantially arcuate, substantially flat, substantially dreadnought, or otherwise sized, shaped, disposed, or otherwise configured so as to allow the user to open a culinary nut with the tool 500, such as while optionally helping avoid damaging the nutmeat.

The unilateral or bilateral extension of tool 500 can provide a lever or other means for prying open a nut shell. The optional bilateral extension configuration of tool 500, for example, can allow opening of a nutshell when the mount is worn on a finger or thumb of a right hand or a left hand of the user, such as to accommodate right-handed or left-handed prying of a nutshell with a single tool. For example, the tool 500 can allow nut shell opening with a forward or bilateral motion of a thumb, when the mount is worn on the thumb, or a combination of such motions.

A nut opening device can include a plurality of tools such as tools 400, 500. For example, the nut opening device can include one or more tools 400, such as extending distally outward from a distal end of a mount. The nut opening device can include more than two distally extending tools, two distally extending tools, one distally extending tool, or no distally extending tool. The nut opening device can include one or more tools 500 extending from a side (e.g., ventral, dorsal, or lateral) of the mount. The nut opening device can include more than two side tools, two side tools, one side tool, or no side tool. The wearable nut opening device can include a combination of one or more distal tools 400 and one or more side tools 500.

The tools 400, 500 can include a size and a shape that allows a pick portion to fit at least partially within an opening of a culinary nut, such as a dehiscent opening of a pistachio. One or more of the tools 400, 500 can include a width dimension 401, 501 that is greater than a thickness dimension 402, 502. The tools 400, 500 (or working portion(s) thereof) can be made from any material that is stiff enough to allow the opening of the culinary nut to be pried open by a user. One or more of the tools 400, 500 can optionally include a blunt edge, such as can help substantially or completely avoid damaging nutmeat of the culinary nut during prying. One or more of the tools 400, 500 can optionally include a sharp edge, such as for helping open a substantially closed shell of a culinary nut, for example, a pistachio.

The nut opening device can optionally include a soft or textured outer surface, such as to help pry open a nutshell or to help grab a hold of nutmeat from a pried-apart nutshell, such as to extract the nutmeat. An entire outer surface, or a portion of an available outer surface of a mount, can include such a soft or textured surface 600. The textured surface 600 can include one or more ridges, grooves, skives, or the like. For example, the textured surface 600 can be similar to the surface of a cheese grater. The textured surface 600 can optionally include a plurality of openings, such as extending all the way or part of the way through to the interior of the mount, or the textured surface can be closed. The textured surface 600 can optionally include a pick portion-type of configuration, such as in addition to one or more other textured morphological features.

Figure 2:
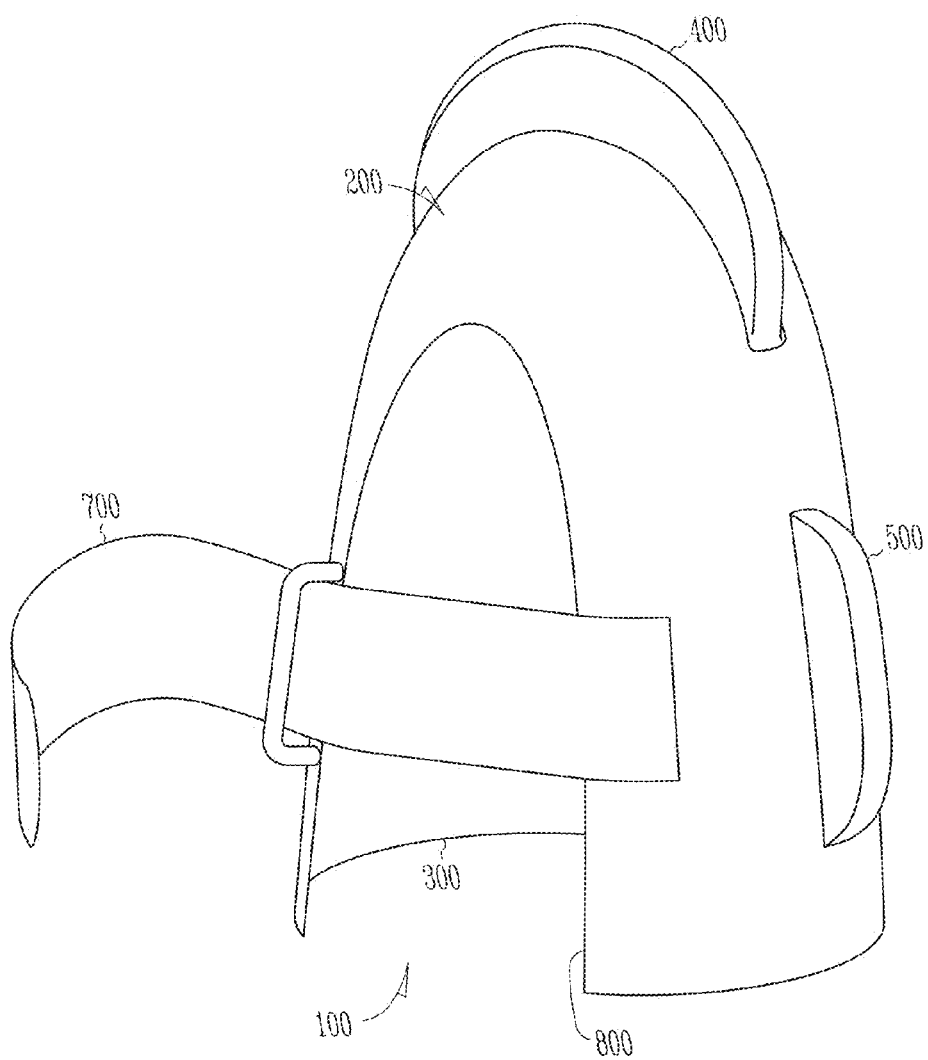
FIG. 2 illustrates a back isometric view of a finger or thumb-wearable culinary nut opening device.
Figure 3:
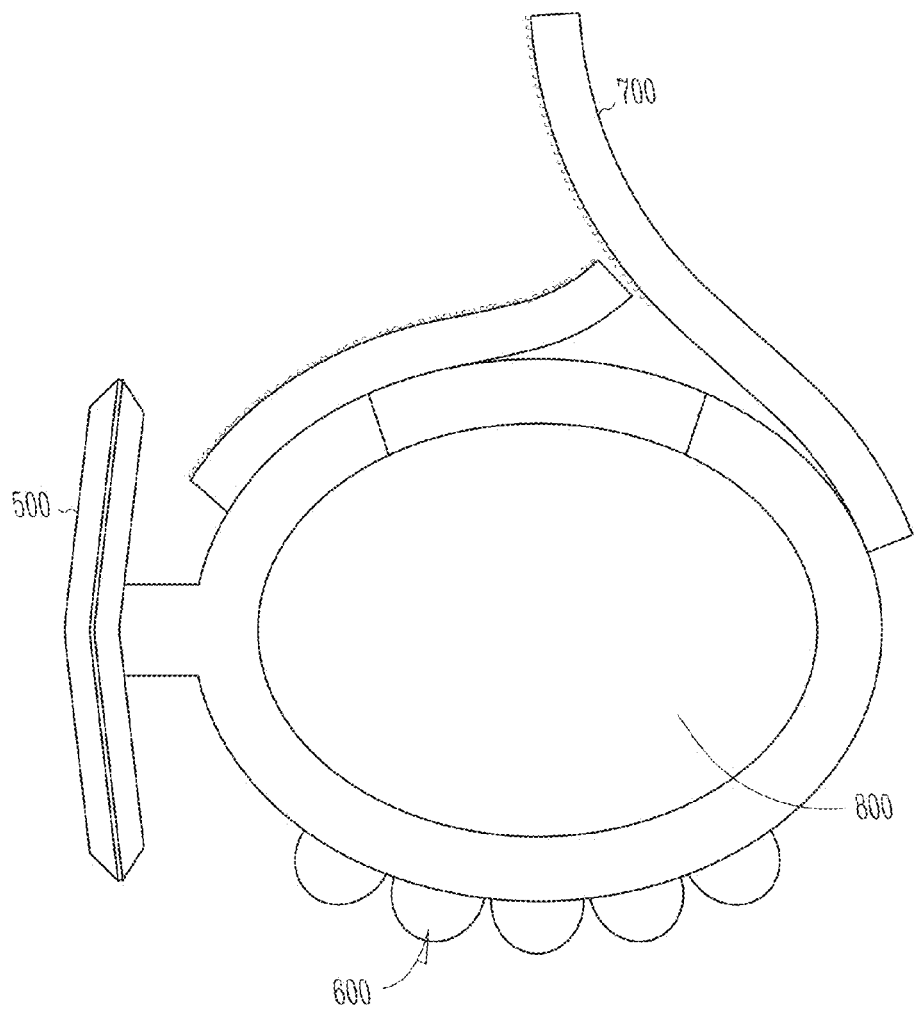
FIG. 3 illustrates a bottom view of a finger or thumb-wearable culinary nut opening device.
Figure 4:
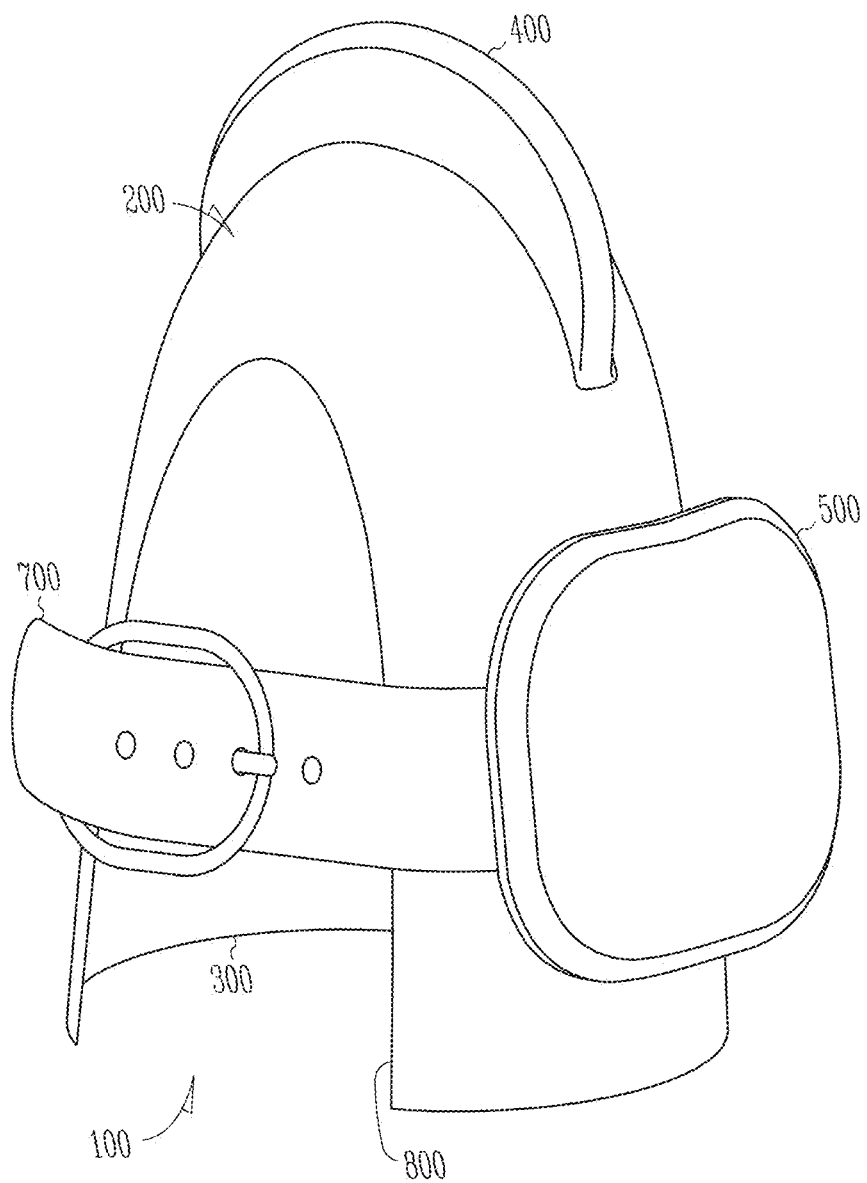
FIG. 4 illustrates a back isometric view of a finger or thumb-wearable culinary nut opening device.

FIGS. 2-4 show examples in which a nut opening device can be size adjustable, such as by the end user. For example, the proximal end 100 of the mount can include a proximal opening 300 connected to a recess 800. The recess 800 can share a border with the proximal opening 300 and can extend along an ventral, dorsal, lateral, or other side portion of the mount, such as to form an opening that is recessed back from the proximal edge of the mount. For example, the recess 800 can be formed by molding or cutting away a portion of the mount back from the proximal opening 300, such as to extend the proximal opening 300 to also be open at a lateral portion of the tool. The recess 800 can define an arcuate or similar shape, such as to accommodate a portion of the inserted finger or thumb, such as during bending or other movements.

The nut opening device can include a plurality of recesses 800. For example, the nut opening device can include two recesses 800. One or both of the recesses 800 can face in a ventral direction outward from a palm-side of the user's hand or can face in a dorsal direction outward from a back-side of the user's hand. The recesses 800 can include both a first recess 800 facing in a ventral direction outward from a palm-side of the user's hand, and a second recess 800 facing in a dorsal direction outward from a back-side of the user's hand, for example, such that these two recesses 800 can be substantially aligned with each other, e.g., in a ventral-dorsal plane. A portion of the culinary nut opening device can optionally be configured such that an entire portion of the user's finger or thumb can be viewed via the recess 800, such as for example to promote air passage to the skin of the user's fingers, such as for breathability purposes.

A recess 800 can be sized, shaped, disposed, or otherwise configured to help provide the user with increased comfort or for ease of use. For example, the recess 800 may allow the user's finger or thumb to bend more easily than if the recess 800 were not present. For example, an arcuate-shaped recess 800 can be configured to frame a distal most knuckle of the finger or thumb of the user. The optional recess 800 can provide the user with an improved fit.

A nut opening device can be made size-adjustable to fit the finger or thumb of different sized users. For example, the nut opening device can be made size-adjustable by manufacturing the mount from an elastic or stretchable material, such as to allow a snug fit. Size adjustment can optionally be carried out by the end-user or another. For example, the nut opening device can be adjusted to fit the finger or thumb of an adult, or a child. For example, as shown in FIG. 2, a size-adjustable portion 700 can include a strap allowing the user to adjust the nut opening device to a comfortable finger or thumb position or tightness. The strap can include a hook and loop material (e.g., VELCRO®), such as shown in the example of FIG. 3. FIG. 4 shows an example in which the strap can include a buckle arrangement. The strap can additionally or alternatively provide size adjustment using one or more other arrangements, such as can include a ratchet, a rack-and-pinion, an escapement, LYNX™ SEF systems, LYNX™ iHOOK!™ FASTENING TECHNOLOGIES, LYNX™ XOLOK™ FASTENING TECHNOLOGIES, adhesive, or other means, for example.

The size-adjustable portion 700 can be disposed on an intermediate or distal portion of a mount such that in use, for example, it can be situated across from a fingernail or thumbnail of an inserted finger or thumb, respectively. Additionally or alternatively, the size-adjustable portion 700 can be disposed on a proximal portion of the mount such that, in use, it can be situated across a finger or thumb pad. A tool 500 can extend from a side of the mount, such as can be located to the right of the size-adjustable portion 700, to the left of the size-adjustable portion 700, or located on a side opposite the size-adjustable portion 700.

Figure 5:
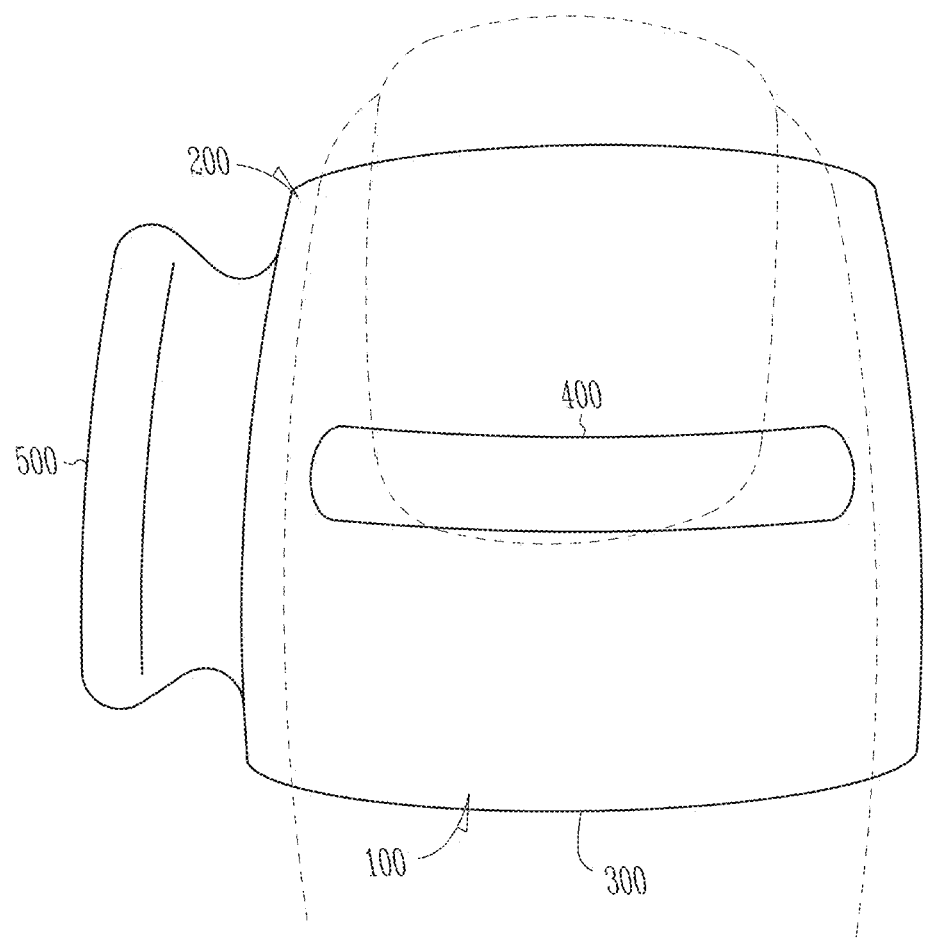
FIG. 5 illustrates a plan view of a ring-like finger or thumb-wearable culinary nut opening device, such as worn on the thumb of a user.

FIGS. 5-8 show examples of a nut opening device having a substantially ring-like configuration. FIG. 5 shows an example in which the distal end 200 of the mount of the wearable nut opener can be open, which can thereby form a substantially ring- or loop-shaped mount. The ring- or loop-shaped mount can be elastically deformable or can be otherwise size adjustable. The ring- or loop-shaped mount can include one or more tools, such as the one or more tools 400, 500. For example, such as shown in FIG. 5, a tool 400 can be laterally disposed on a side of the mount (e.g., the ventral side) such that the tip of the tool 400 is substantially parallel to an edge of the mount, such as parallel to the edge defined by the cross-sectional plane of the proximal opening 300. A tool 500 can be laterally disposed on a side (e.g., ventral side, dorsal side, or lateral side) of the mount such that the base or tip of the tool 500 defines an edge that substantially perpendicular to the edge of the mount defined by the cross-sectional plane of the proximal opening 300, such as in the example shown in FIG. 5. The substantially perpendicularly located tool 500 can include an extension comprising a pick portion that can be sized and shaped to fit at least partially within an opening of a culinary nut, such as a pistachio, and having sufficient stiffness to allow the culinary nut to be pried open by the user. The tool 500 can include a base and can optionally include, a unilateral or (in the example shown in FIG. 5) a bilateral appendage coupled to the base. The appendages can act as one or more pick portions. When the mount is worn on a user's thumb, for example, a tool can extend and face outward in a ventral direction as viewed from the user's palm.

Figure 6:
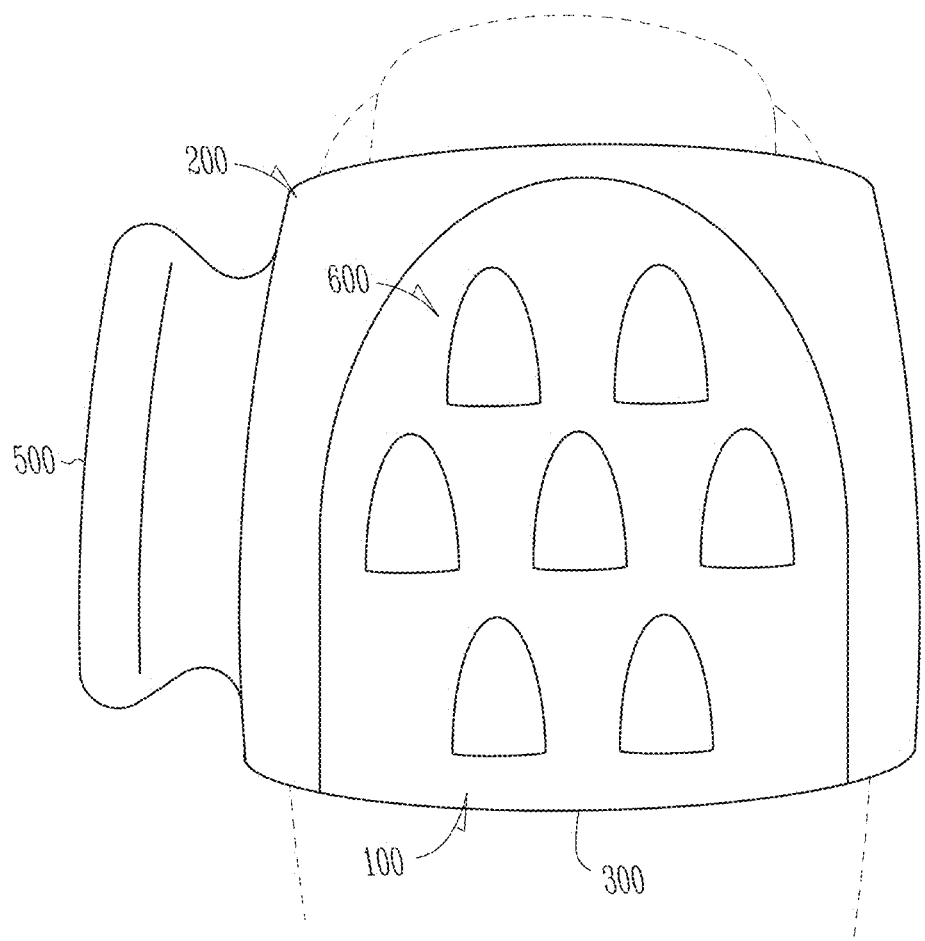
FIG. 6 illustrates a plan view of a ring-like finger or thumb-wearable culinary nut opening device.

FIG. 6 shows a nut opening device that can be similar to the nut opening device of FIG. 5, but can optionally include a textured surface 600. The textured surface 600 can be useful, such as for prying or otherwise shelling culinary nuts, such as further discussed herein.

Figure 7:
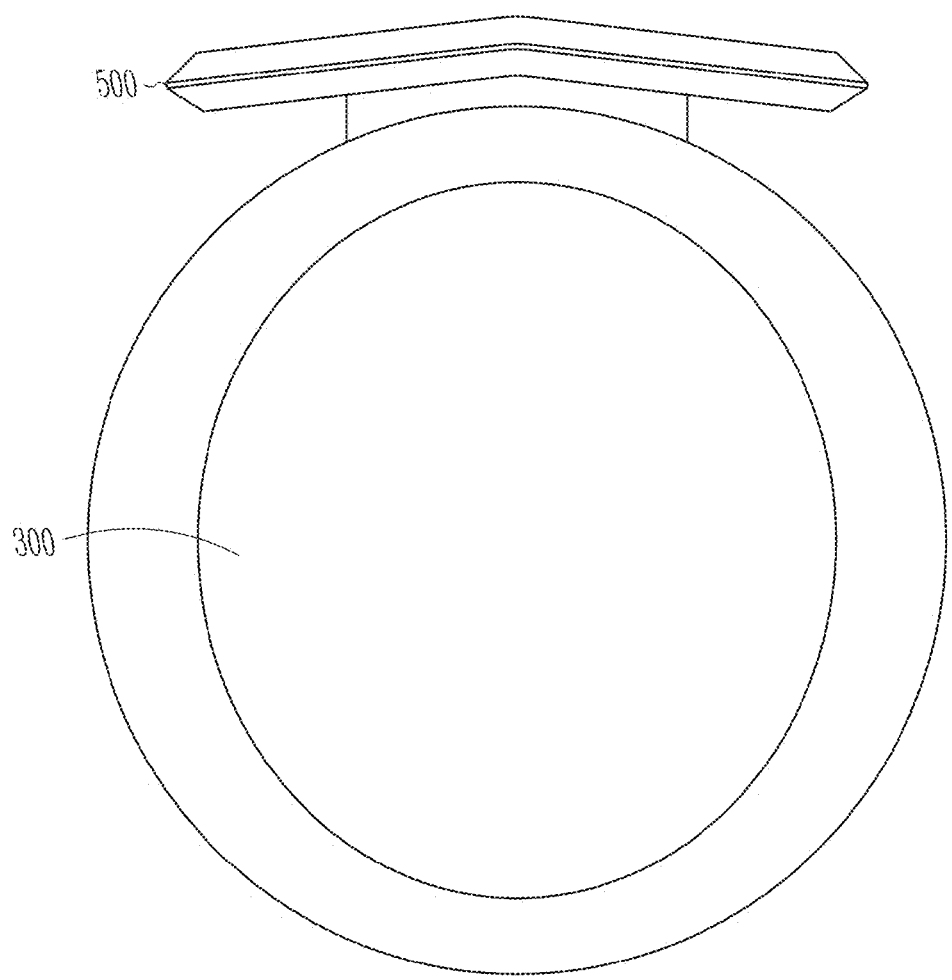
FIG. 7 illustrates a bottom view of a closed ring-like finger or thumb-wearable culinary nut opening device.

FIG. 7 shows a nut opening device that can be similar to the nut opening device of FIG. 5, but optionally need not include a tool 400.

Figure 8:
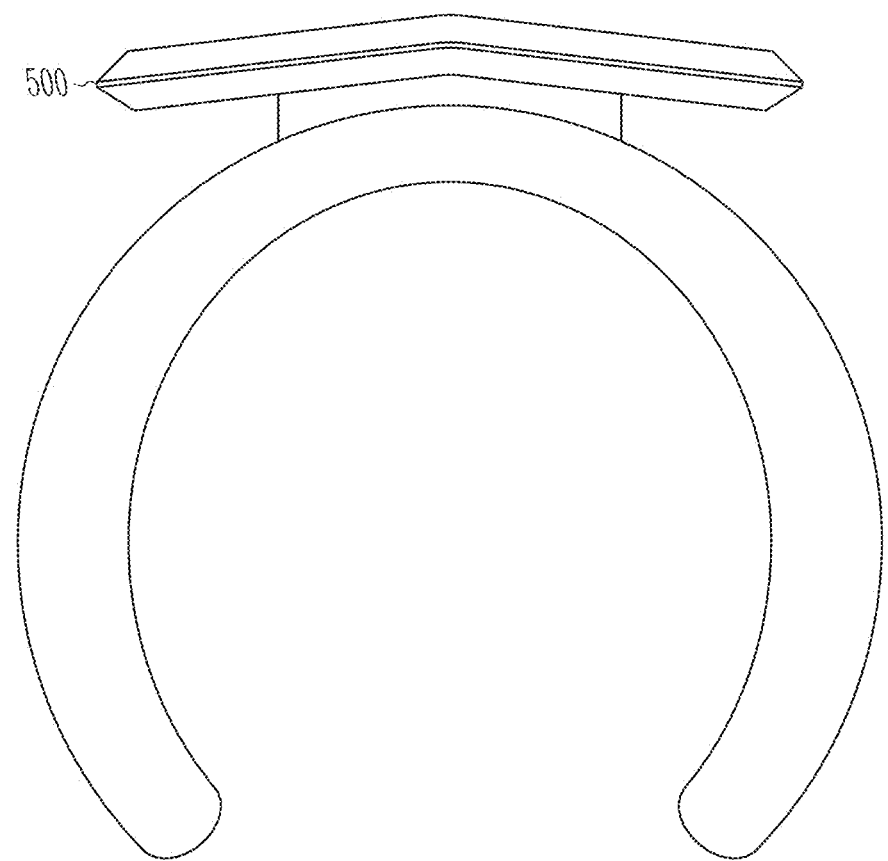
FIG. 8 illustrates a bottom view of an open finger or thumb-wearable culinary nut opening device.

FIG. 8 shows a nut opening device that can have an open ring-like configuration, which need not form a complete closed ring. This open ring-like configuration can provide size adjustability to the nut opening device. The open ring-like configuration can allow for size expansion, size contraction, or both, and can be manufactured from an elastic material. The open ring-like configuration can be combined with one or more additional securing mechanisms, such as the size adjustable portion 700, such as shown in the examples of FIGS. 3 and 4.

Figure 9:
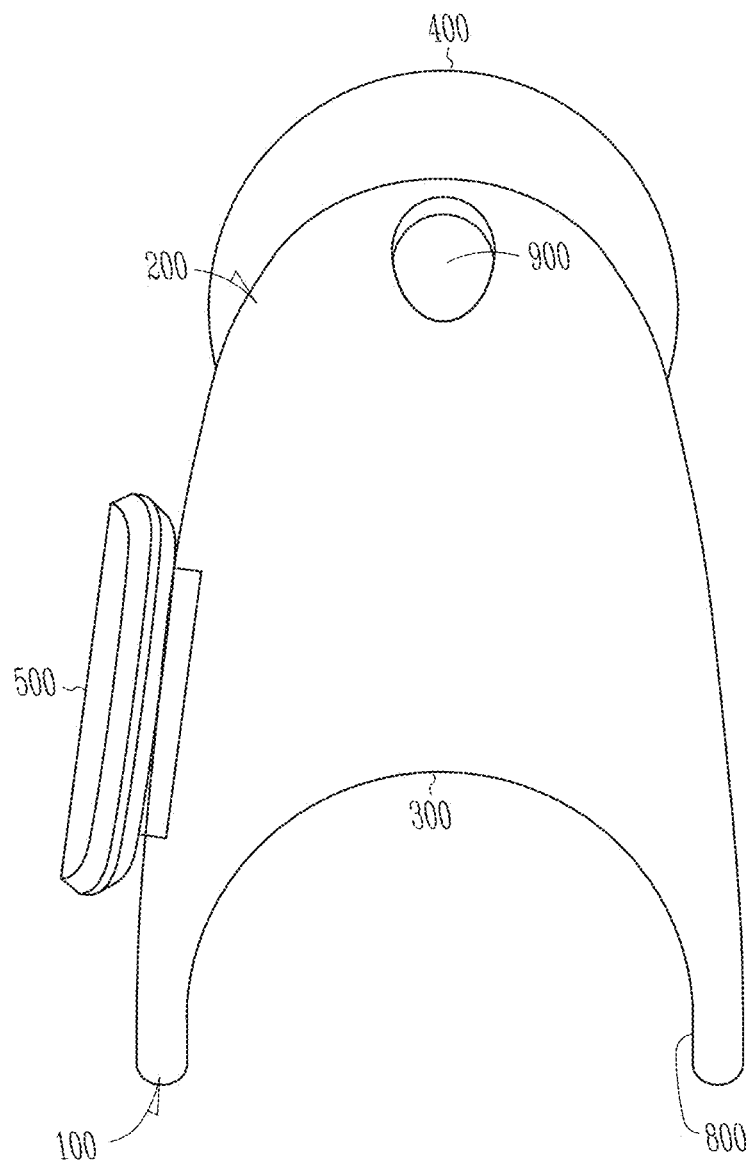
FIGS. 9 and 10 illustrate isometric views of a finger or thumb-wearable culinary nut opening device.
Figure 10:
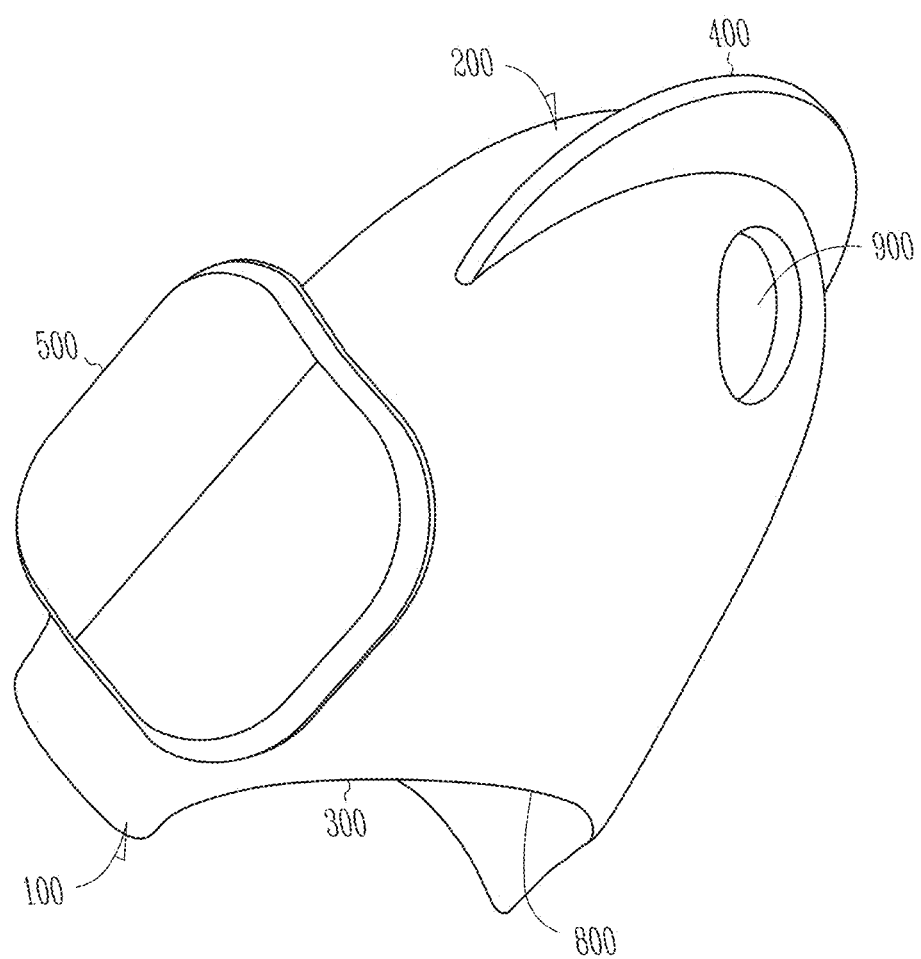

FIGS. 9 and 10 show examples of a substantially (but not entirely) closed distal end 200 of a thimble-shaped mount, such as can include one or more air passageways, such as a vent 900. The vent 900 can include a circular or arcuate shape, for example, or can include a square shape, a rectangular shape, or any other shape sufficient to allow air passage or breathability to a nut opening device, such as to provide ventilation to the finger or, should the nut opening device be ingested into the trachea, to help inhibit or avoid asphyxiation. The nut opening device can include one or a plurality of vents 900, such as can be situated at various positions on the mount. For example, the nut opening device can include one vented side (e.g., dorsal, ventral, or lateral) and one non-vented side (e.g., dorsal, ventral, or lateral). Two or more of the vents 900 can be disposed in close proximity to one another or can be spread over an outer surface of the mount. The vents 900 can be disposed to help inhibit or avoid asphyxiation, should the nut opening device be swallowed or aspirated, such as by the user, a child, a pet, or the like. The nut opening device can include any number of vents 900, such as, for example, 10 vents, 9 vents, 8 vents, 7 vents, 6 vents, 5 vents, 4 vents, 3 vents, 2 vents, 1 vent, or no vent. The location of the tools 400, 500 can be largely unaffected by the location of the one or more vents 900.

Figure 11A:
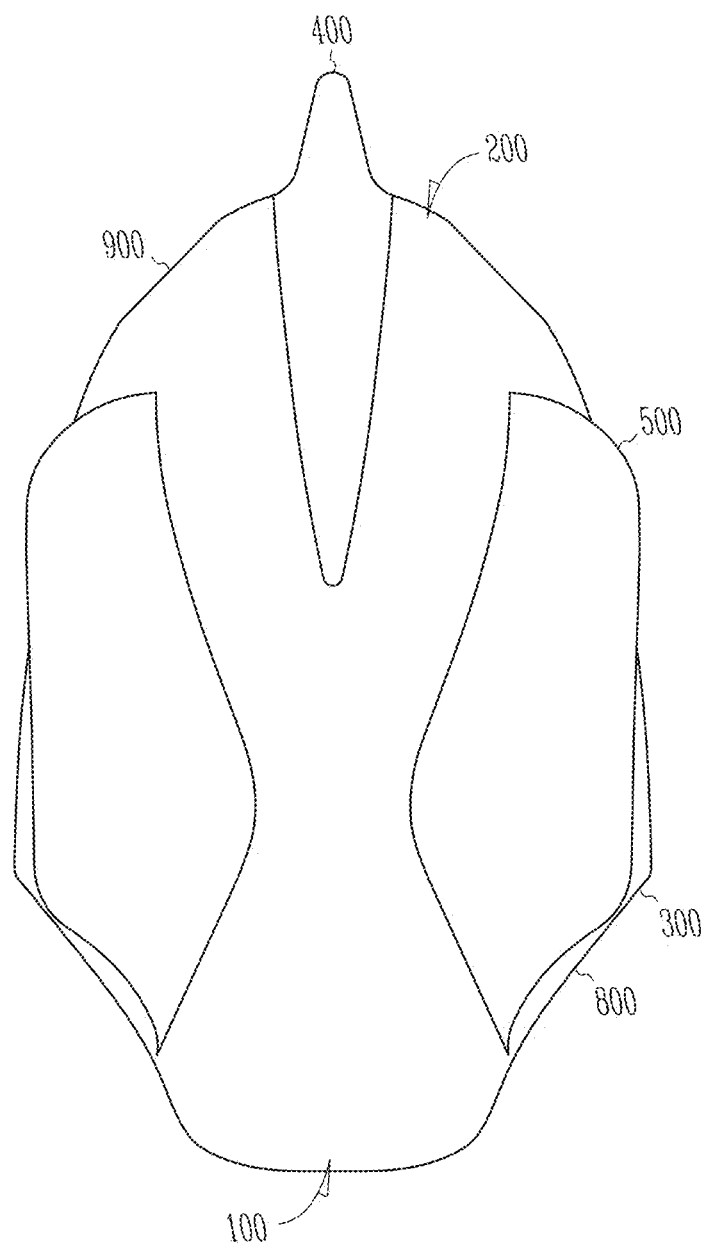
FIGS. 11A-C illustrate various views of a finger or thumb-wearable culinary nut opening device.
Figure 11B:
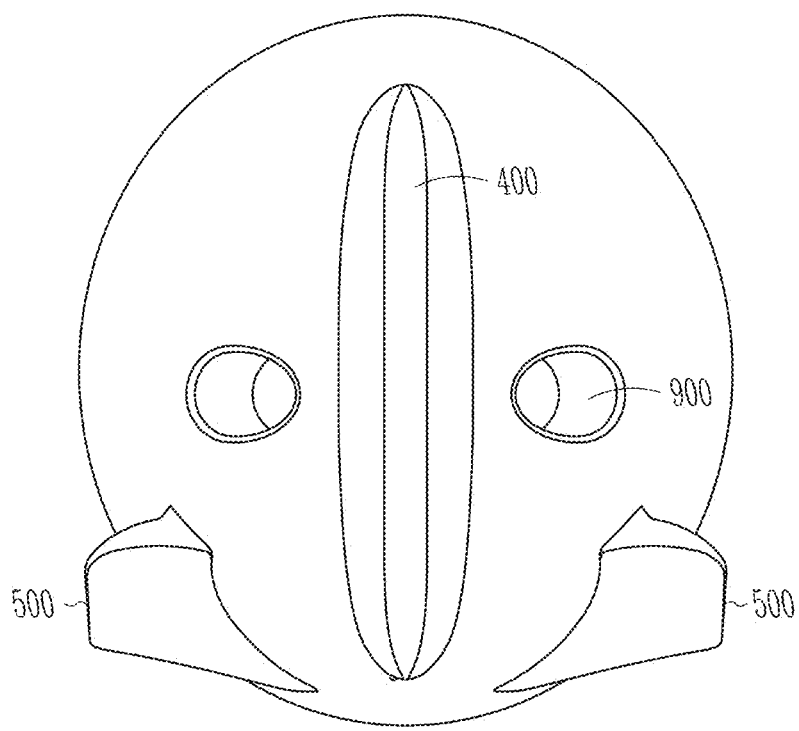
Figure 11C:
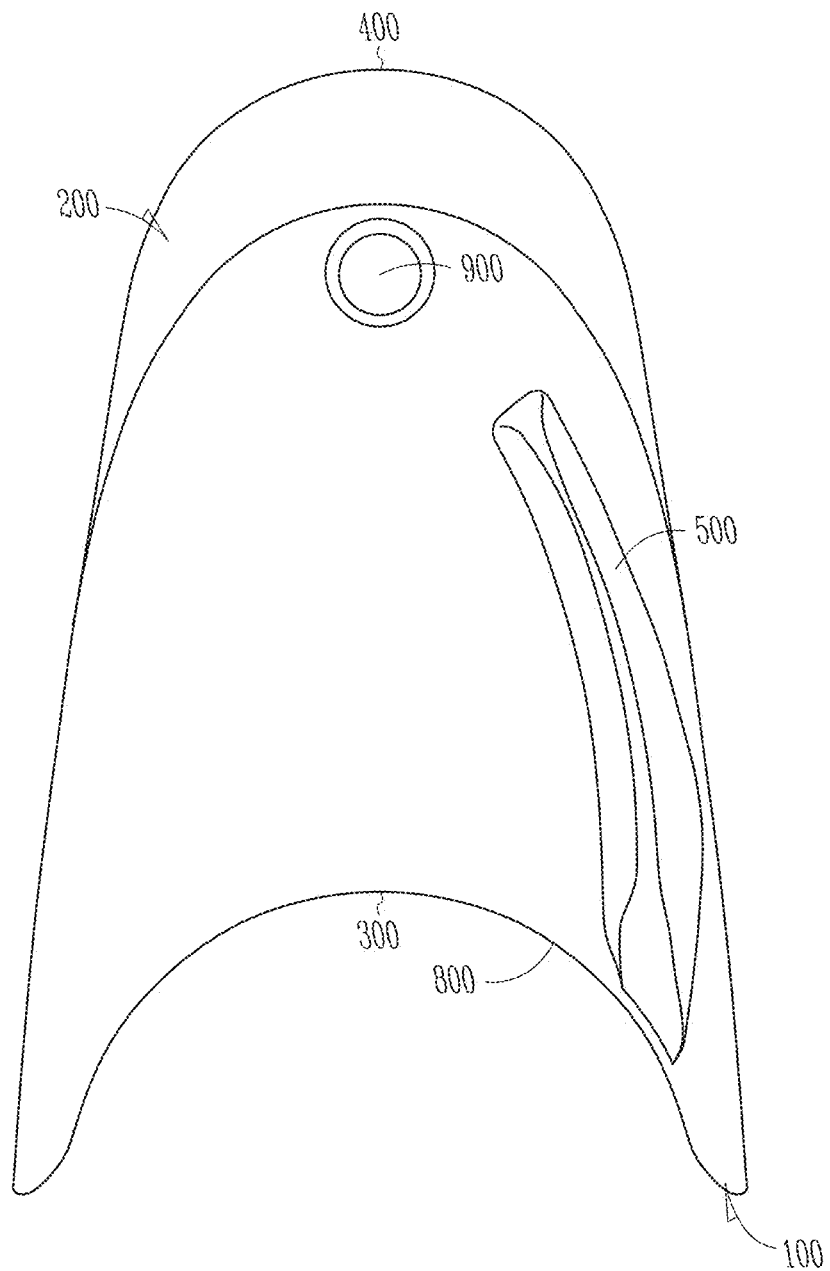

FIGS. 11A-C show an example of a nut opening device that can include one or more tools 500 that can extend from a side of the mount, such as having a fin or wing-type configuration. The one or more tools 500 can be sized, shaped, or otherwise configured to have a sleek feel in the hand of a user or to look attractive to the user.

The one or more tools 500 can define a plane-like plate that can extend from any side surface of the mount, such as from a ventral surface (such as shown in FIG. 11A), or from a dorsal surface, or from a lateral surface. The one or more tools 500 can define a straight plane plate, or a plane-like plate that is substantially arcuate. A pair of tools can include substantially coplanar dorsal and ventral tools 500, such as can define substantially the same plane, such as shown in the example of FIG. 11B. The plane defined by the dorsal and ventral tools 500 can be substantially straight, such as shown in FIG. 11B, or substantially arcuate, such as shown in FIGS. 11C and 12B. An arcuate shape can help provide the user with leverage for twisting or otherwise opening a culinary nut, such as a pistachio. When viewing the nut opening device from a front (e.g., ventral) side so that the large surface area of a tool 400 extending from a distal end of the mount is visible, such as shown in FIG. 11C, the tool 500 can be substantially disposed on the right portion of the ventral side of the nut opener, on a left portion of the ventral side of the nut opener, or along a medial (e.g., middle) plane of the ventral side of the nut opener. Two tools 500 can be substantially disposed on or toward a right lateral side of the opener, on the left lateral side of the opener, or along a middle plane of the opener (e.g., on dorsal and ventral sides) when viewing the nut opening device from the front (e.g., ventral) side. One tool 500 can be disposed on the front (e.g., ventral) side, and one tool 500 can be disposed on the back (e.g., dorsal) side, for example, such as shown in FIGS. 11A and 11B. The one or more tools 500 can be substantially arcuate, for example, to arc (e.g., in a distal direction) toward the middle of the nut opening device, or the tool 500 can arc (e.g., in a distal direction) away from the middle of the nut opening device. A configuration having one tool 500 disposed on the front (e.g., ventral) side, and one tool 500 disposed on the back (e.g., dorsal) side can allow a single nut opening device to be functional for both right-handed and left-handed users.

Figure 12A:
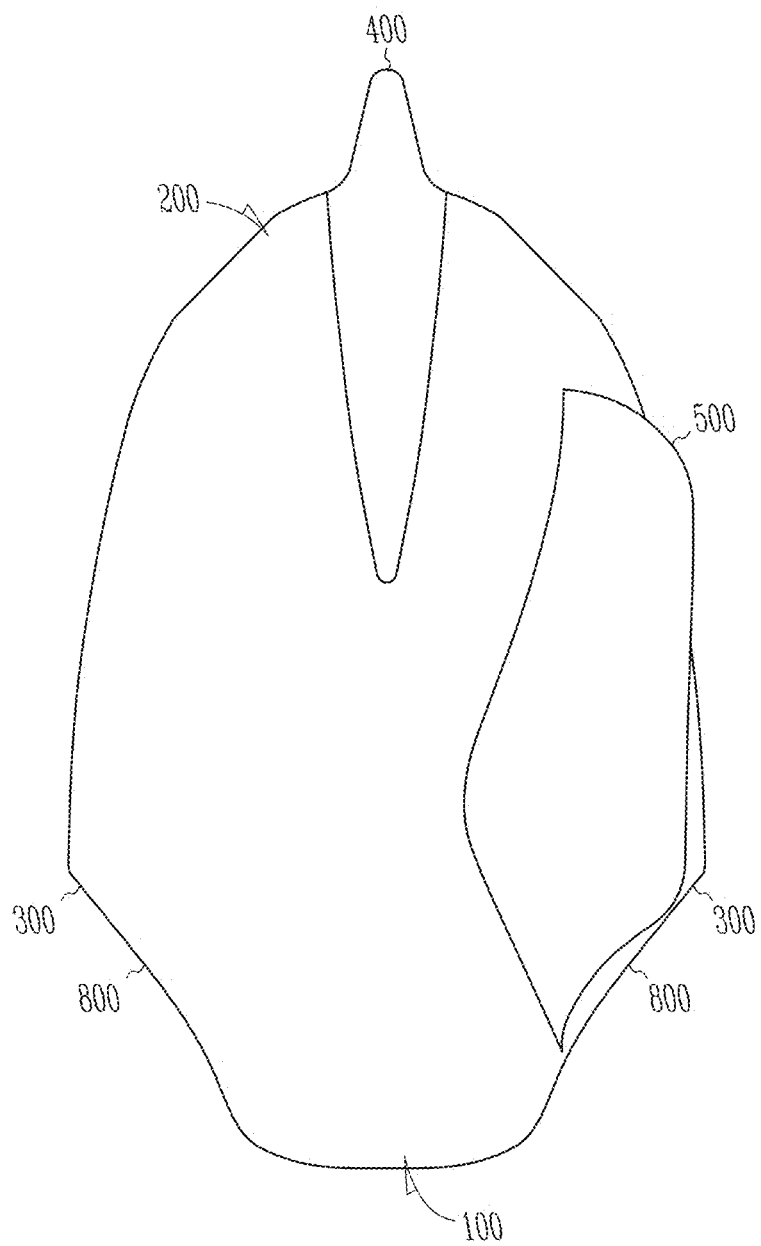
FIGS. 12A-C illustrate various views of a finger or thumb-wearable culinary nut opening device.
Figure 12B:
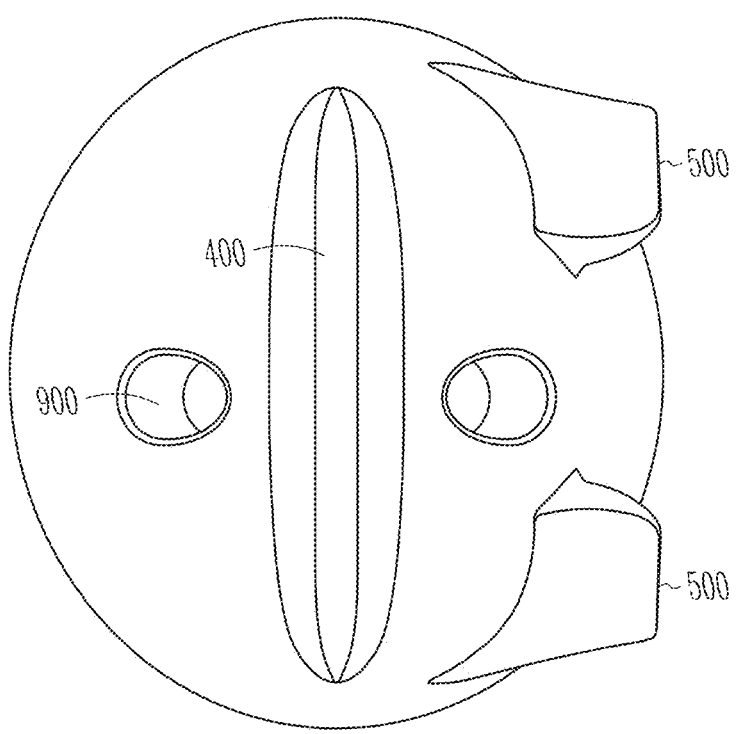
Figure 12C:
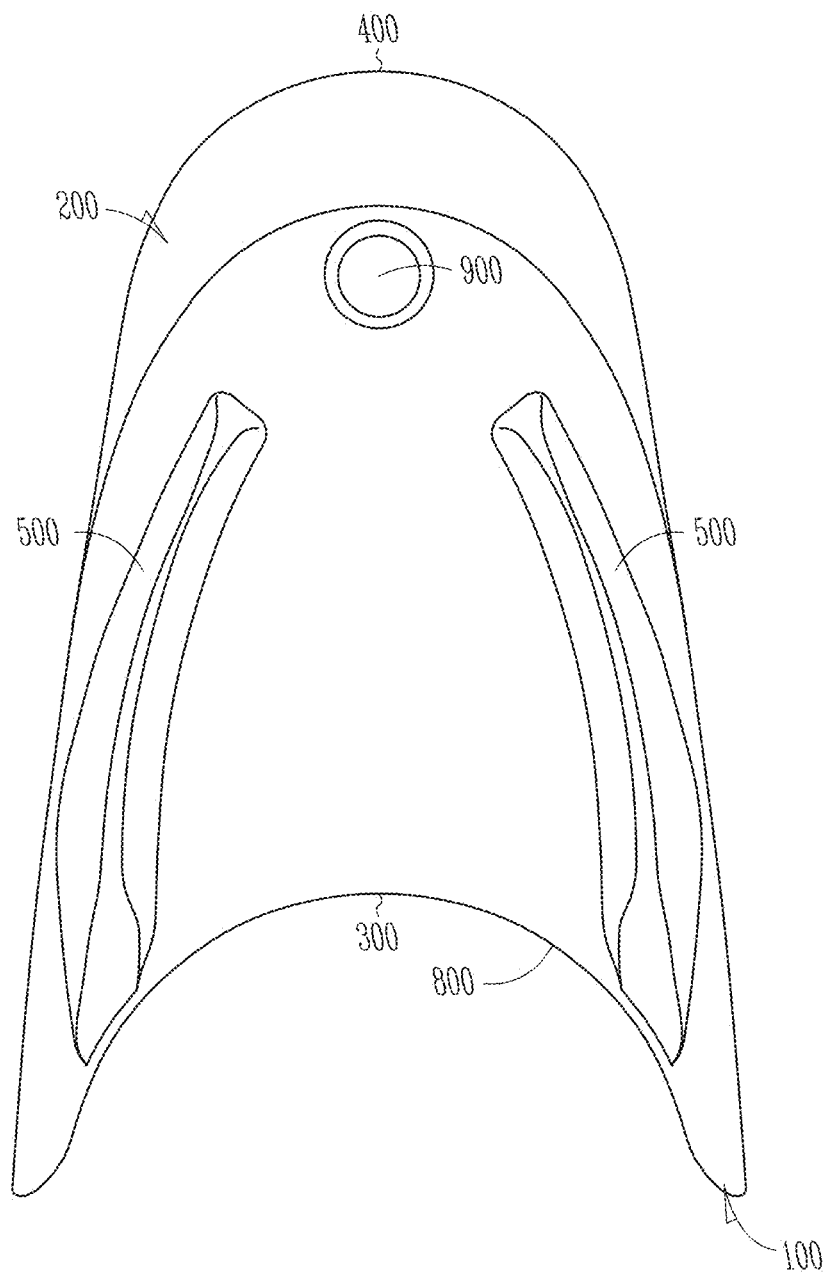

FIGS. 12A-C show an example of a nut opening device that can have more than one tool 500 disposed on the same side of a mount. For example, the nut opening device can have two tools 500 that can be configured to be located on the bottom (e.g., ventral side) of the mount. The two tools 500 can be substantially parallel to each other. The two tools 500 can each define a plane or a plane-like plate. In an example, one or more of the defined planes or plane-like plates can be arcuate. The two tools 500 can be disposed on the same top (e.g., dorsal) or bottom (e.g., ventral) surface of the mount. The two tools 500 can be disposed on opposite side portions of the same top (e.g., dorsal) or bottom (e.g., ventral) surface of the mount, such as shown.

When the nut opening device is viewed from the side, such as shown in the examples of FIGS. 11A and 12A, it can be seen that a diameter (or like lateral cross-dimension) of a distal end 200 of a mount can be any size. When the distal end 200 is elliptically shaped in cross-section, the inner diameter (e.g., along the major axis of the elliptically-shaped cross-section) of the distal end can be approximately 1 inch (approximately 2.54 cm), when measured from the inner surfaces of the distal end in a lateral direction that is orthogonal to a longitudinal central axis of the finger to be inserted into the mount. In various examples, the distal end 200 of the mount can include an inner diameter (or like cross-sectional major or minor dimension) of approximately 1 inch (approximately 2.54 cm), approximately 0.922 inches (approximately 2.34 cm), approximately 0.9 inches (approximately 2.29 cm), approximately 0.8 inches (approximately 2.03 cm), approximately 0.729 inches (approximately 1.85 cm), approximately 0.7 inches (approximately 1.78 cm), approximately 0.6 inches (approximately 1.52 cm), approximately 0.5 inches (approximately 1.27 cm), approximately 0.4 inches (approximately 1.02 cm), or approximately 0.3 inches (approximately 0.76 cm).

When the nut opening device is viewed from the top (e.g., dorsal side) or bottom (e.g., the ventral side, such as shown in FIGS. 11C and 12C), the inner diameter (or like cross-sectional major or minor dimension) of the distal end 200 can be any size, such as approximately 1 inch (approximately 2.54 cm), approximately 0.972 inches (approximately 2.47 cm), approximately 0.9 inches (approximately 2.29 cm), approximately 0.8 inches (approximately 2.03 cm), approximately 0.729 inches (approximately 1.85 cm), approximately 0.7 inches (approximately 1.78 cm), approximately 0.6 inches (approximately 1.52 cm), approximately 0.5 inches (approximately 1.27 cm), approximately 0.4 inches (approximately 1.02 cm), or approximately 0.3 inches (approximately 0.76 cm). When measured longitudinally from the distal end 200 to the proximal end 100, the nut opening device can be selected from a variety of sizes. For example, when measured from the distal end 200 to the proximal end 100 (e.g., not including the distance associated with any distally-extending tool), the wearable nut opener can measure approximately 2 inches (approximately 5.08 cm), approximately 1.75 inches (approximately 4.45 cm), approximately 1.5 inches (approximately 3.81 cm), approximately 1.4 inches (approximately 3.56 cm), approximately 1.338 inches (approximately 3.40 cm), approximately 1.3 inches (approximately 3.30 cm), approximately 1.2 inches (approximately 3.05 cm), approximately 1.1 inches (approximately 2.79 cm), approximately 1.0 inch (approximately 2.54 cm), approximately 0.9 inches (approximately 2.29 cm), approximately 0.8 inches (approximately 2.03 cm), approximately 0.7 inches (approximately 1.78 cm), approximately 0.6 inches (approximately 1.52 cm), or approximately 0.5 inches (approximately 1.27 cm).

A recess 800 of the nut opening device can be selected from a variety of sizes. For example, when measured longitudinally from the distal-most to proximal-most portion, the recess 800 can be approximately 0.7 inches (approximately 1.78 cm), approximately 0.6 inches (approximately 1.52 cm), approximately 0.5 inches (approximately 1.27 cm), approximately 0.474 inches (approximately 1.20 cm), approximately 0.4 inches (approximately 1.02 cm), approximately 0.373 inches (approximately 0.95 cm), approximately 0.3 inches (approximately 0.76 cm), approximately 0.2 inches (approximately 0.51 cm), or approximately 0.1 inches (approximately 0.25 cm).

The tools 400, 500 (e.g., which can be or can include a pick or pick-like portion) of the nut opening device can be selected from a variety of sizes. For example, e.g., when measured from distal most tip to proximal most tip where it meets the mount, a distally located pick or other tool 400 can measure approximately 0.5 inches (approximately 1.27 cm), approximately 0.4 inches (approximately 1.02 cm), approximately 0.3 inches (approximately 0.76 cm), approximately 0.2 inches (approximately 0.51 cm), or approximately 0.1 inches (approximately 0.25 cm).

A side located pick or other tool 500 (e.g., on the dorsal, ventral, or lateral side of the mount), e.g., when measured from distal most tip to proximal most tip, can measure approximately 1 inch (approximately 2.54 cm), approximately 0.918 inches (approximately 2.33 cm), approximately 0.9 inches (approximately 2.29 cm), approximately 0.8 inches (approximately 2.03 cm), approximately 0.729 inches (approximately 1.85 cm), approximately 0.7 inches (approximately 1.78 cm), approximately 0.6 inches (approximately 1.52 cm), approximately 0.5 inches (approximately 1.27 cm), approximately 0.4 inches (approximately 1.02 cm), or approximately 0.3 inches (approximately 0.76 cm).

Figure 13A:
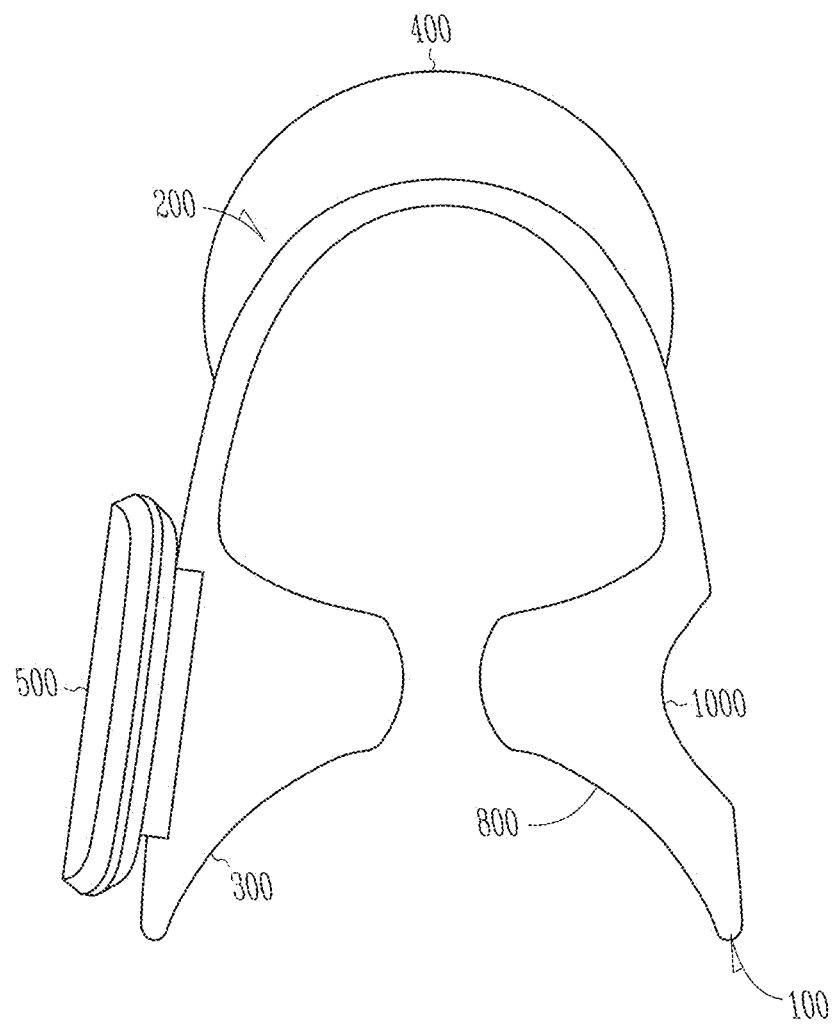
FIGS. 13A and 13B illustrate similar views of a finger or thumb-wearable culinary nut opening device.
Figure 14A:
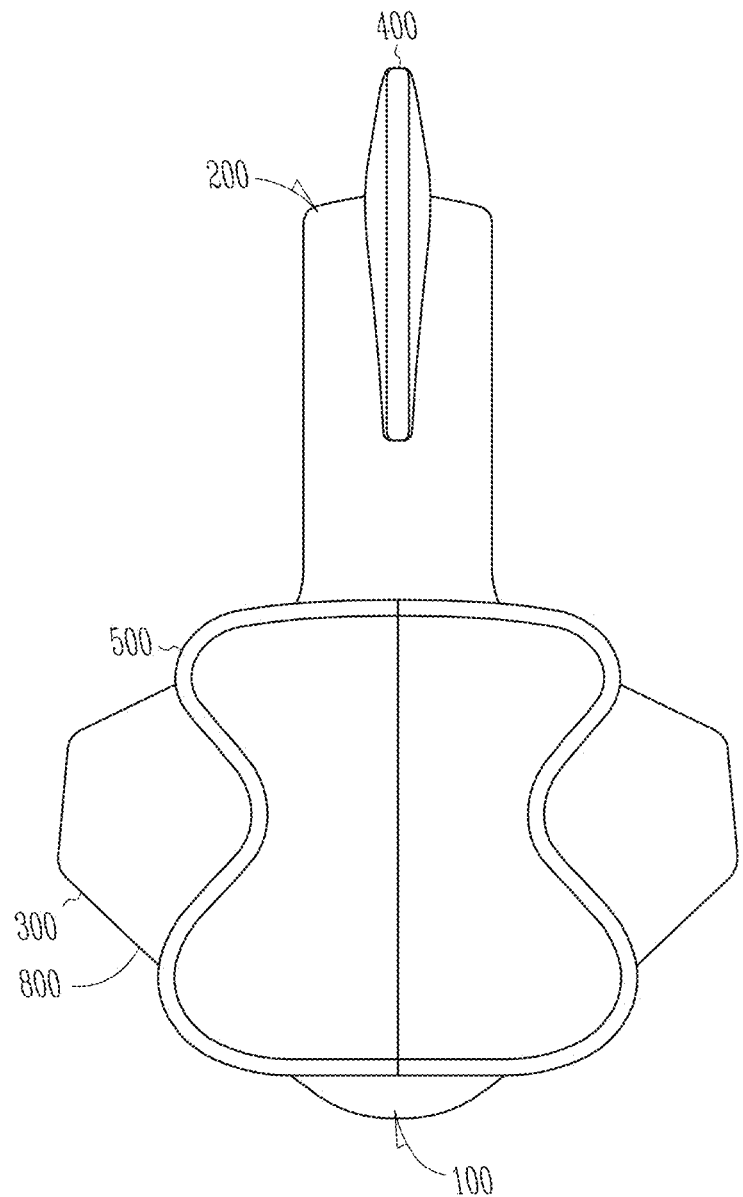
FIGS. 14A and 14B illustrate similar views of a finger or thumb-wearable culinary nut opening device.
Figure 14B:
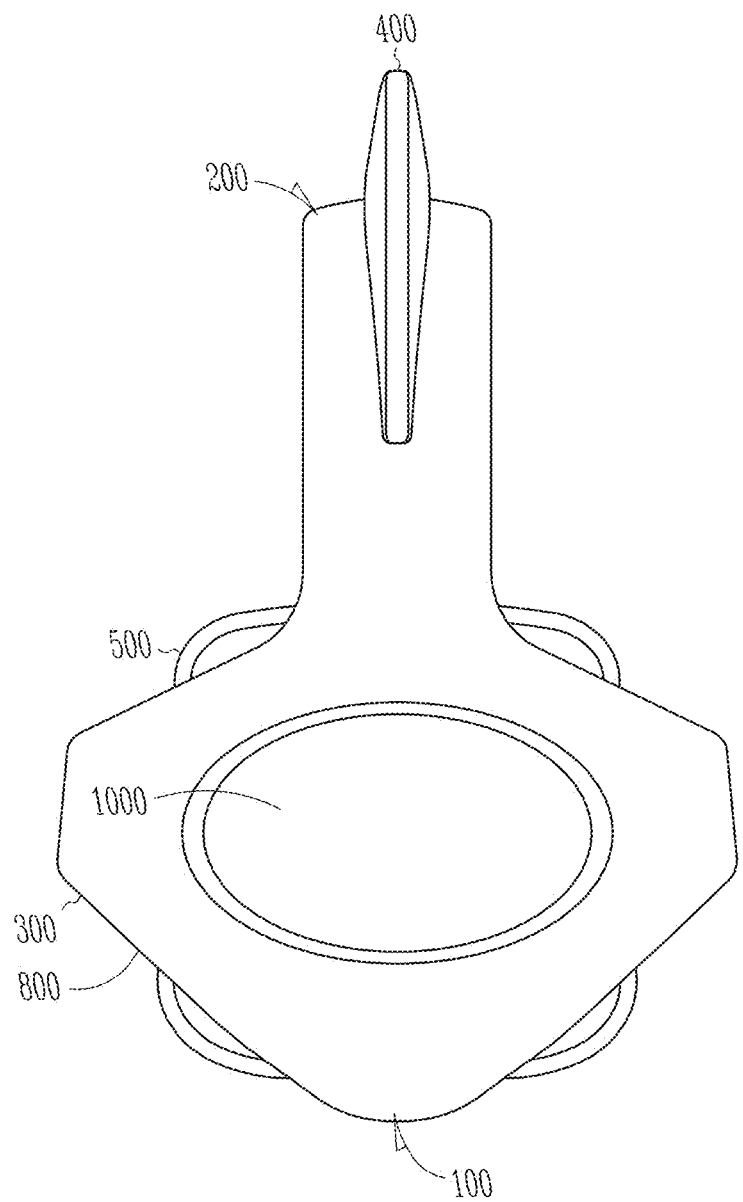

FIGS. 13A, 14B show an example of a nut opening device mount that can have a shape other than a thimble shape. For example, the nut opener device mount can be of any configuration that can fit on or about a portion of a user's finger or thumb and can support one or more picks or other tools 400, 500. For example, a distal portion of the nut opener mount can support one or more tools 400 and one or more circumferential side (e.g., lateral, ventral, or dorsal) surfaces of the mount can support one or more tools 500. An example of a dreadnought tool 500 is depicted in FIG. 14A.

Figure 13B:
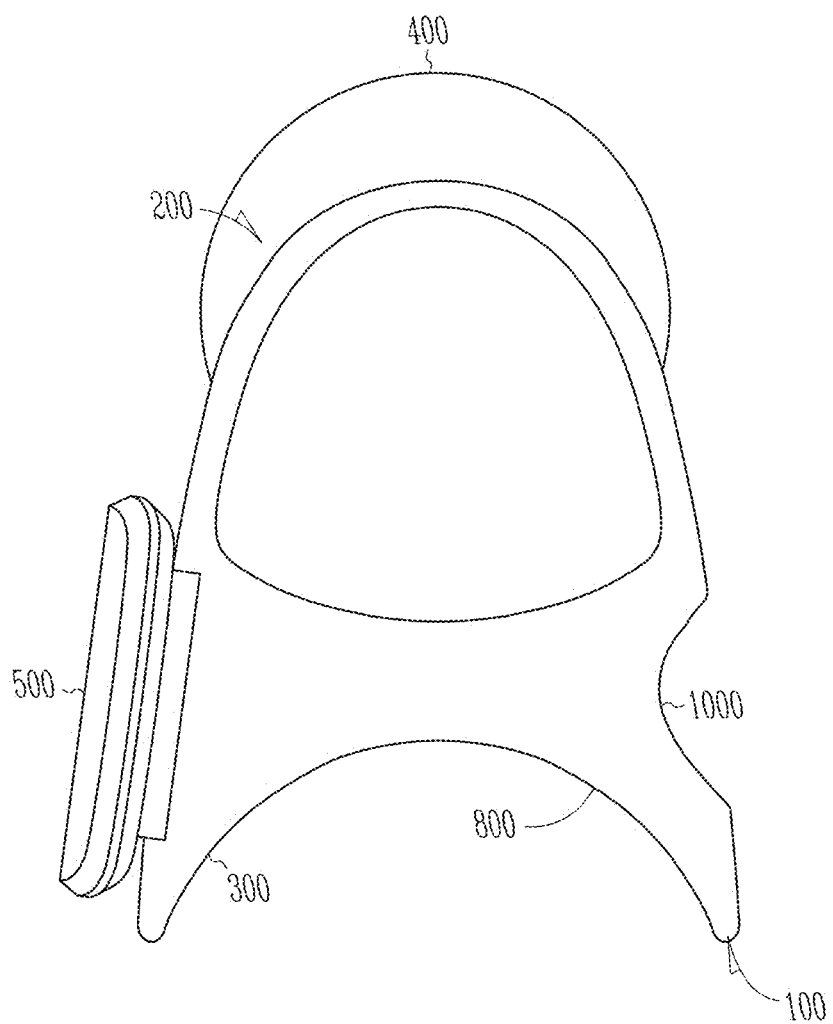

Various other options of configuring the nut opening device are possible. For example, a proximal opening 300 of the nut opening device can be defined by an arcuate edge that can extend unbroken from right to left portions of a side (e.g., ventral, dorsal, lateral) of the user's finger or thumb, such as shown in FIG. 13B. In an example, the proximal opening 300 can be defined by an arcuate edge that can extend from right to left portions of a side (e.g., ventral, dorsal, lateral) of the user's finger or thumb, but with the arcuate edge broken in a medial region of the side of the user's finger or thumb, such as to define a more distal cutout region, such as shown in FIG. 13A. The mount can additionally or alternatively include one or more other cutout portions 1000, such as on a lateral or other side, such as shown in FIGS. 13A, 13B, and 14B. The cutout portion 1000 can optionally be disposed against a lateral side of the knuckle of a user, such as to provide a better fit, comfort, or increased maneuverability of the nut opening device.

FIGS. 15A, 15B, 15C, 15D, 15E, 15F, and 15G show various views of an example of a nut opening device that can include a mount extending from a proximal end 100 to a distal end 200. The proximal end 100 of the mount of the nut opening device can include a proximal opening 300. The proximal opening 300 can be sized, shaped, disposed, or otherwise configured to allow snug and comfortable insertion of a distal end portion of a user's finger or thumb into the mount of the nut opening device. A distal end 200 of the mount of the nut opening device can define a distal opening 900. The distal opening 900 can be sized, shaped, disposed, or otherwise configured to allow air passage to the finger or thumb region upon which the mount of the nut opening device is worn. The distal opening 900 can additionally or alternatively be sized, shaped, disposed, or otherwise configured to allow a long fingernail or thumbnail to extend out of the distal vent opening 900. This can help permit convenient wearing or use of the nut opening device even by a user having a long fingernail or thumbnail. The distal opening 900 can additionally or alternatively be sized, shaped, disposed, or otherwise configured to allow a portion of the finger or thumb to protrude therefrom, such as while at least somewhat inhibiting or limiting the amount of protrusion therefrom by a finger or thumb of a targeted size or shape. This can help permit snug wear by a variety of different finger sizes and shapes, such as by allowing the mount to be positioned at different distances with respect to the distal tip of the finger or thumb to allow properly snug and secure seating thereupon.

Figure 15A:
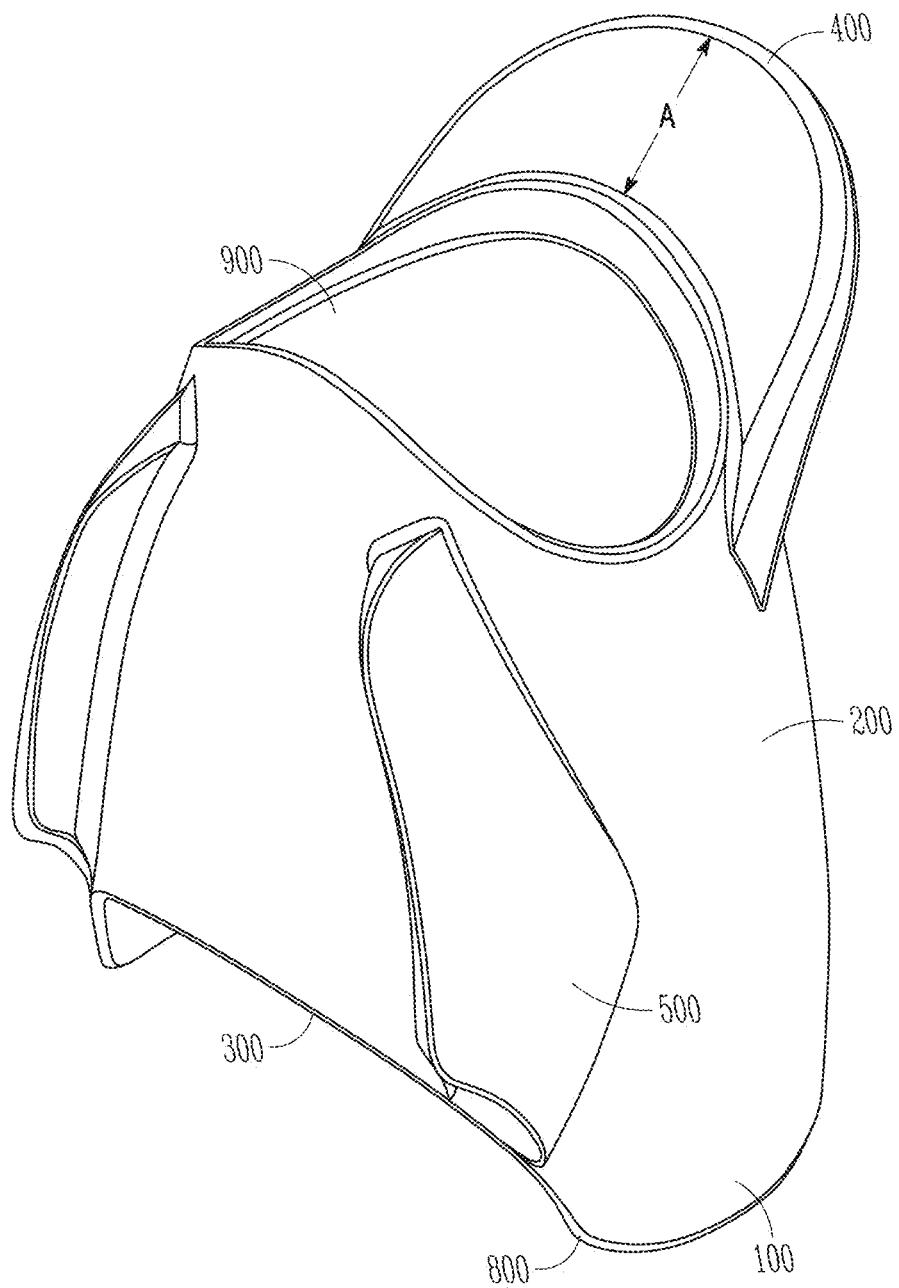
FIGS. 15A, 15B, 15C, 15D, 15E, 15F, and 15G show various views of an example of a nut opening device.
Figure 15B:
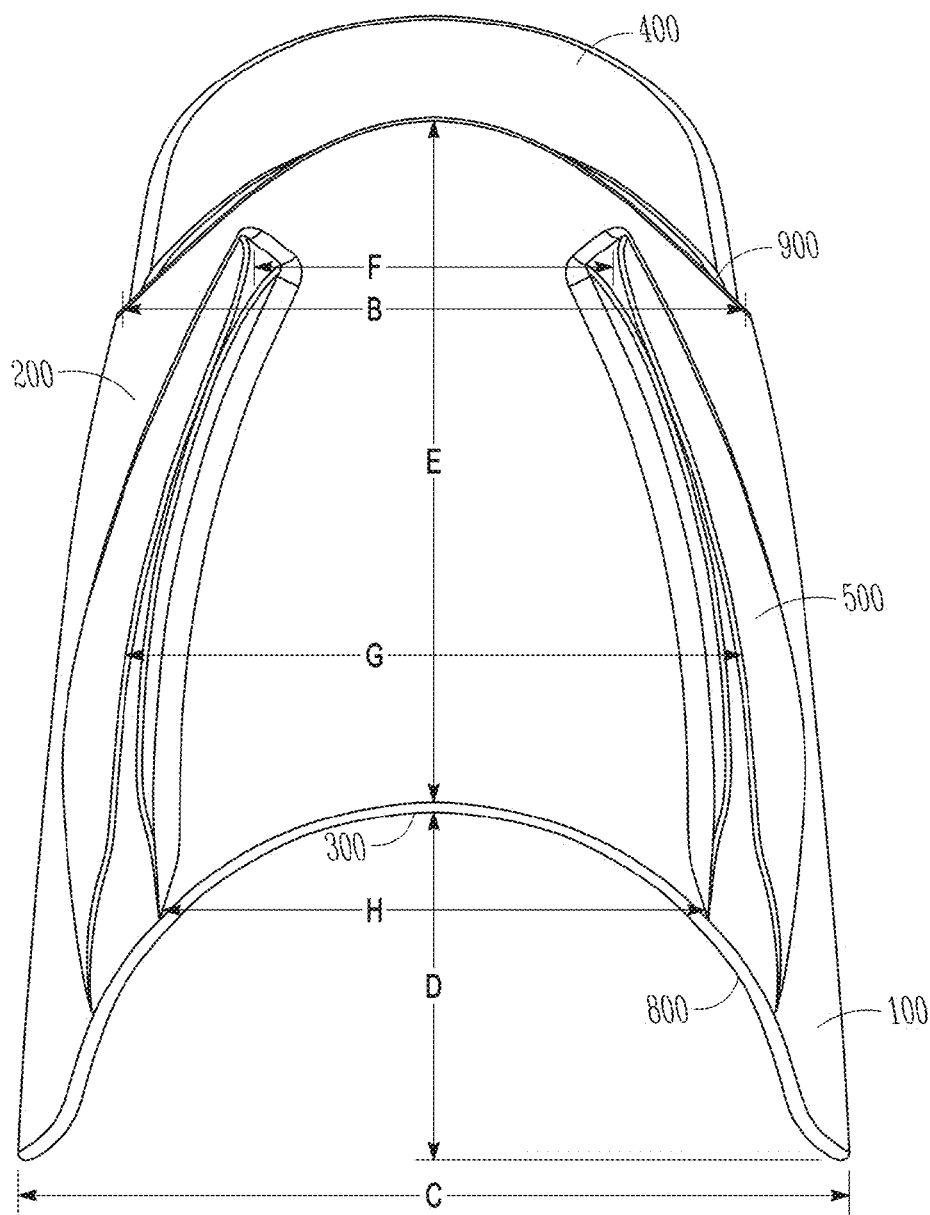
Figure 15C:
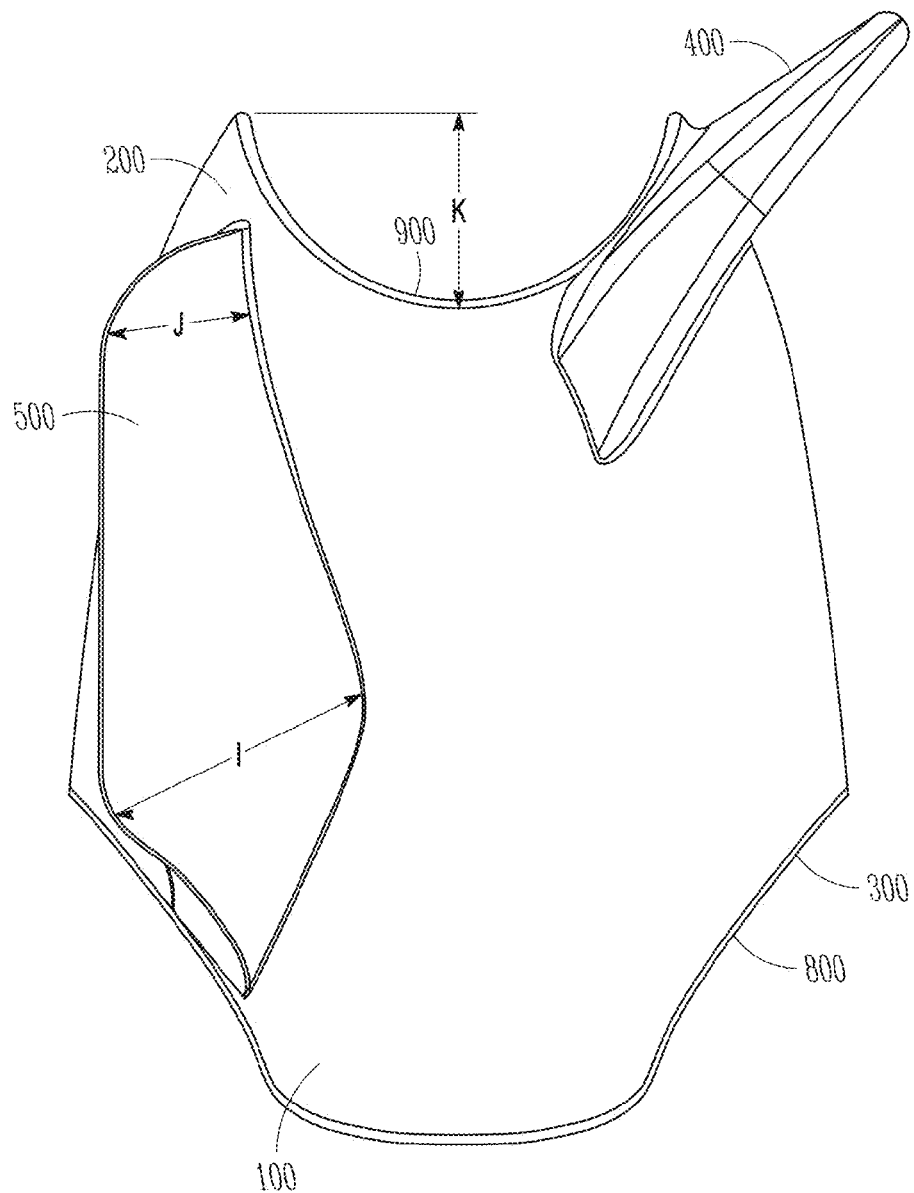
Figure 15D:
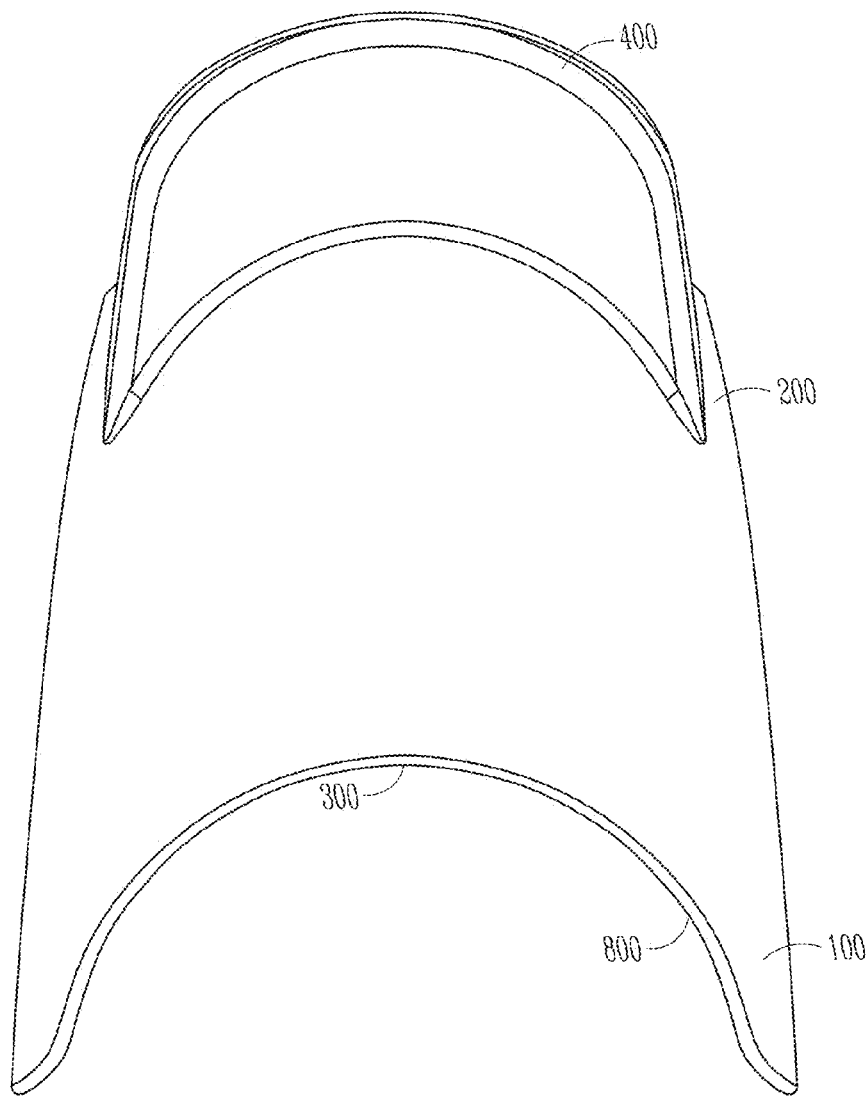
Figure 15E:
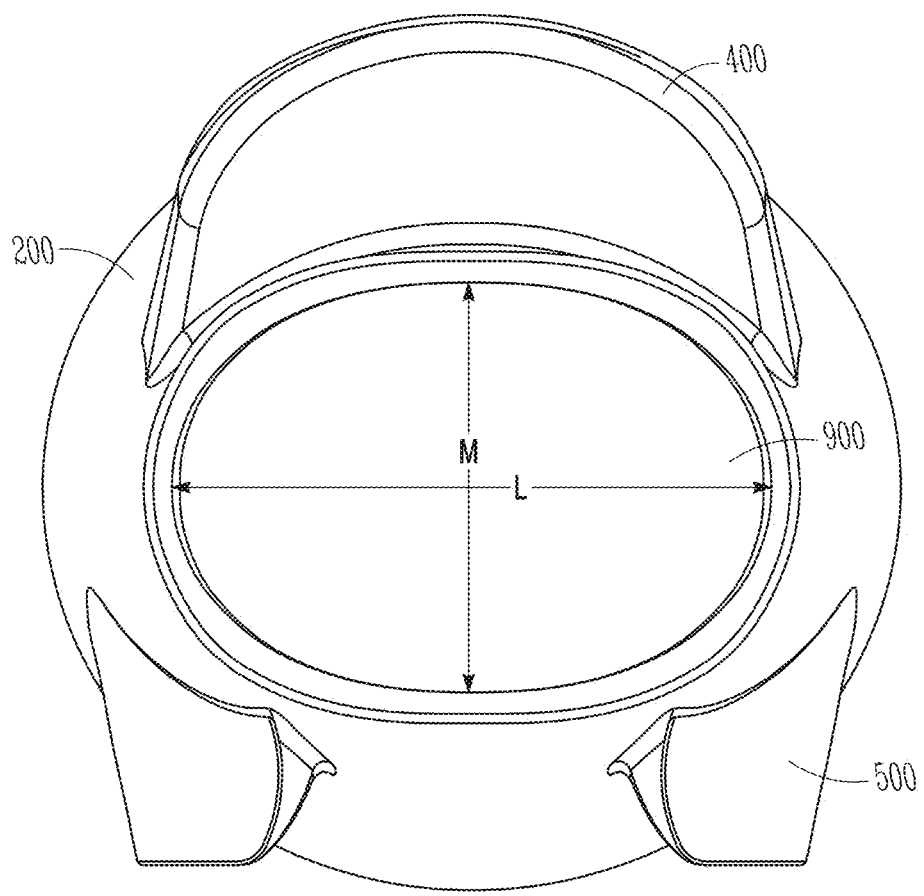
Figure 15F:
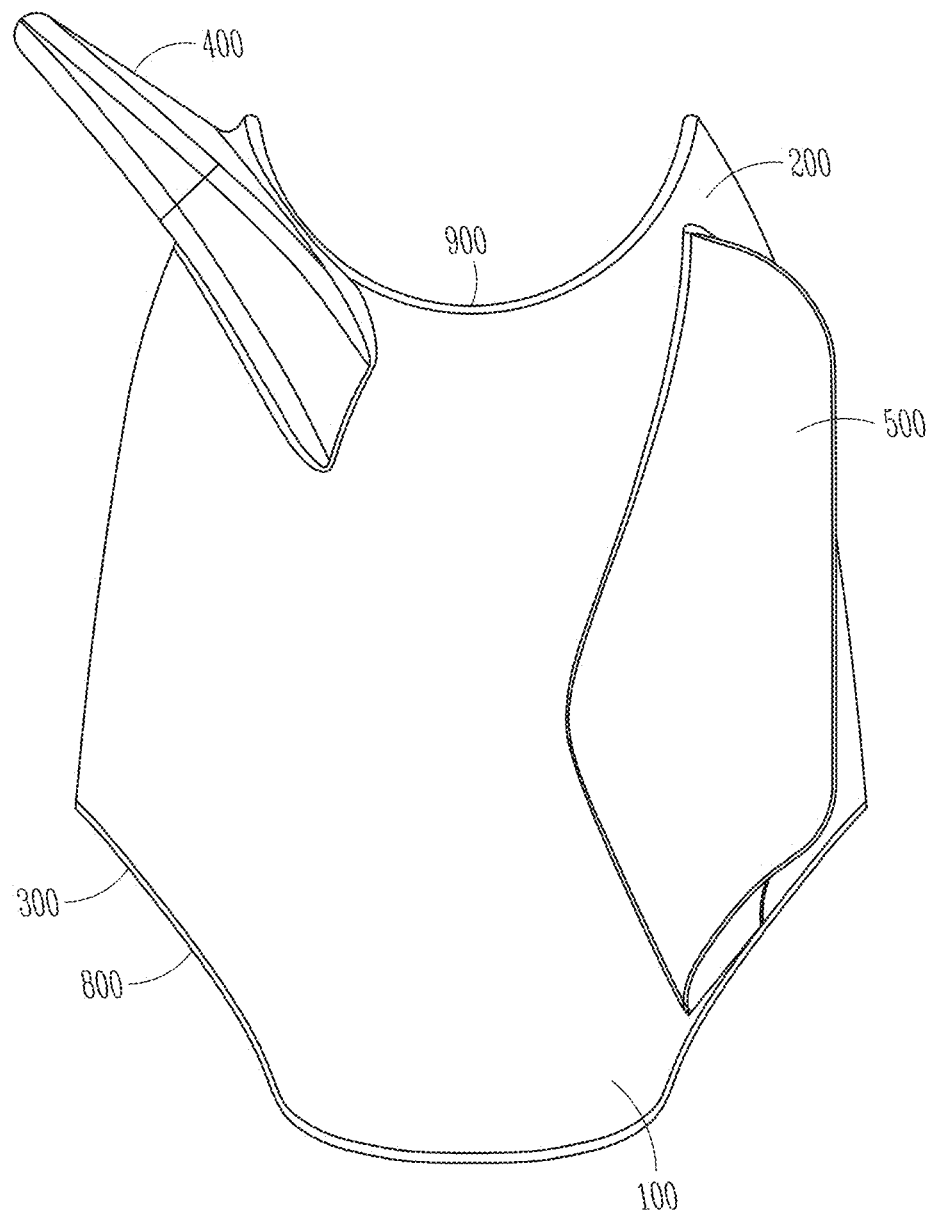
Figure 15G:
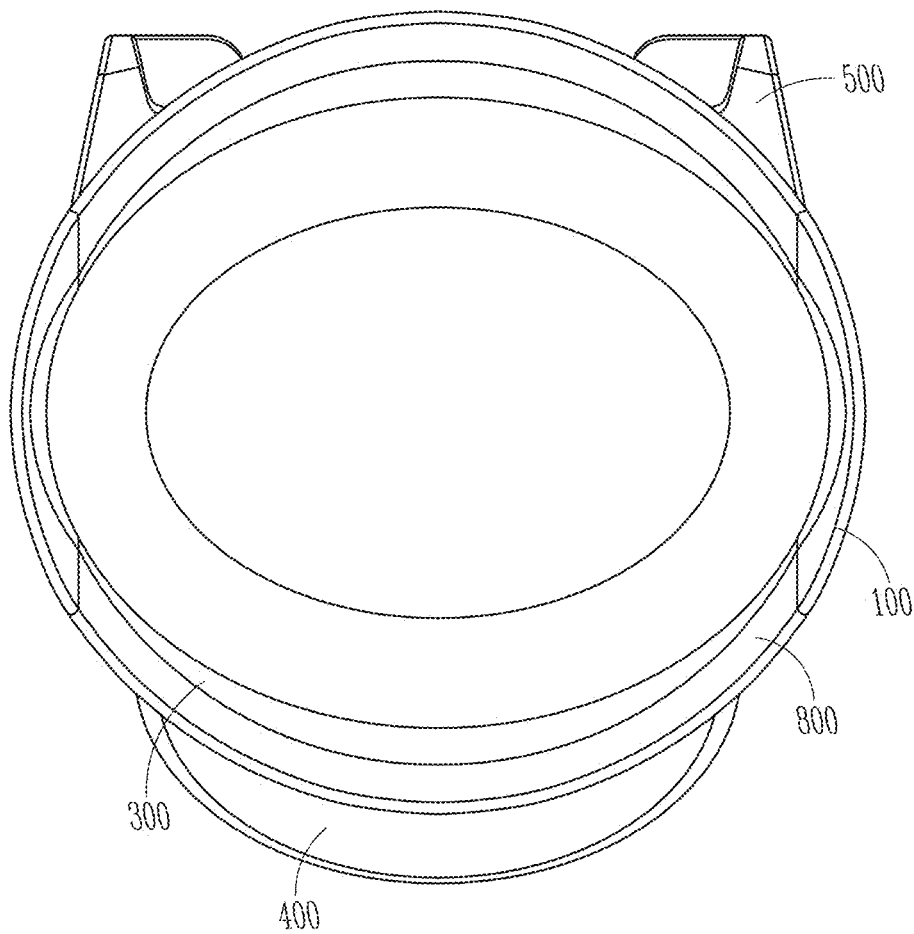

The pick or other distally extending tool 400 can be canted away (e.g., ventrally or, as shown in FIG. 15C, dorsally) from the longitudinal central axis of the user's finger or thumb, such as at an angle of 45 degrees, or at an angle of between 30 degrees and 60 degrees. This can allow use of the pick or other distal tool 400 while still providing a distal opening 900 that can be situated, sized, shaped, or otherwise configured to allow a long fingernail to extend out therefrom, such as when the nut opener device is being worn during use.

A ventral (or other) side of the mount can include one or more (e.g., a pair) of elongated longitudinally-extending arcuate plate-like picks or other tools 500, such as can be sized, shaped, disposed, or otherwise configured to be inserted into the dehiscent opening of a culinary nut (such as a pistachio) for prying opening the nutshell, such as with a side-to-side swiping motion of the user's finger or thumb. In an example, the distal ends of the pair of picks or other tools 500 can be closer to each other than the proximal ends of the pair of picks or other tools 500 are to each other. In an example, the medial portions of the pair of picks or other tools 500 can be farther from each other than the distal ends of the pair of picks or other tools 500 are from each other, or than the proximal ends of the pair of picks or other tools 500 are from each other. The ventral edges of the picks or other tools 500 can be sized, shaped, disposed, or otherwise configured to permit insertion into a dehiscent opening of a culinary nut shell, such as that of a pistachio nut, such as without damaging the nutmeat. The proximal portions of the picks or other tools 500 can flare out slightly farther (e.g., farther ventrally) than the distal portions of the picks or other tools 500. The interior region of the mount of the nut opener can define an oval or elliptical cross-section orthogonal to the longitudinal axis of the finger or thumb portion inserted therein. This can help inhibit rotation of the nut opener with respect to the finger or thumb upon which it is worn, such as when prying a nutshell with a lateral (side-to-side) motion of the finger or thumb or with a rotational motion of the finger or thumb.

The nut opening device and instructions can optionally be included with a or within a package or container of culinary nuts, such as pistachios. For example, the nut opening device and instructions can be included inside the culinary nut package or container, or can be bundled alongside the culinary nut package or container. A logo can be placed on a surface of the nut opening device (e.g., on a surface of the mount), such as for advertising or decoration purposes. The logo can be graphical or textual in nature, such as to help remind the user of the brand of culinary nut purchased and thereby spur the user to purchase further culinary nuts of the same brand. The Instructions For Use can include textual or graphical descriptions for use, such as for traditional end-split pistachios (or other culinary nuts) and for side-split pistachios (or other culinary nuts):

"Traditional—Step One—Press your thumb against your pointer finger and slightly curve your hand. Step Two—Place the bottom appendage on the top lip of the shell and rotate your wrist." and "Side-Split—Step One—Wrap your pointer finger around the front of the PISTACHIO THUMB™ [nut opener device] and close your fist. Step Two—Place the tip appendage into the slit and rotate your wrist."

Figure 16A:
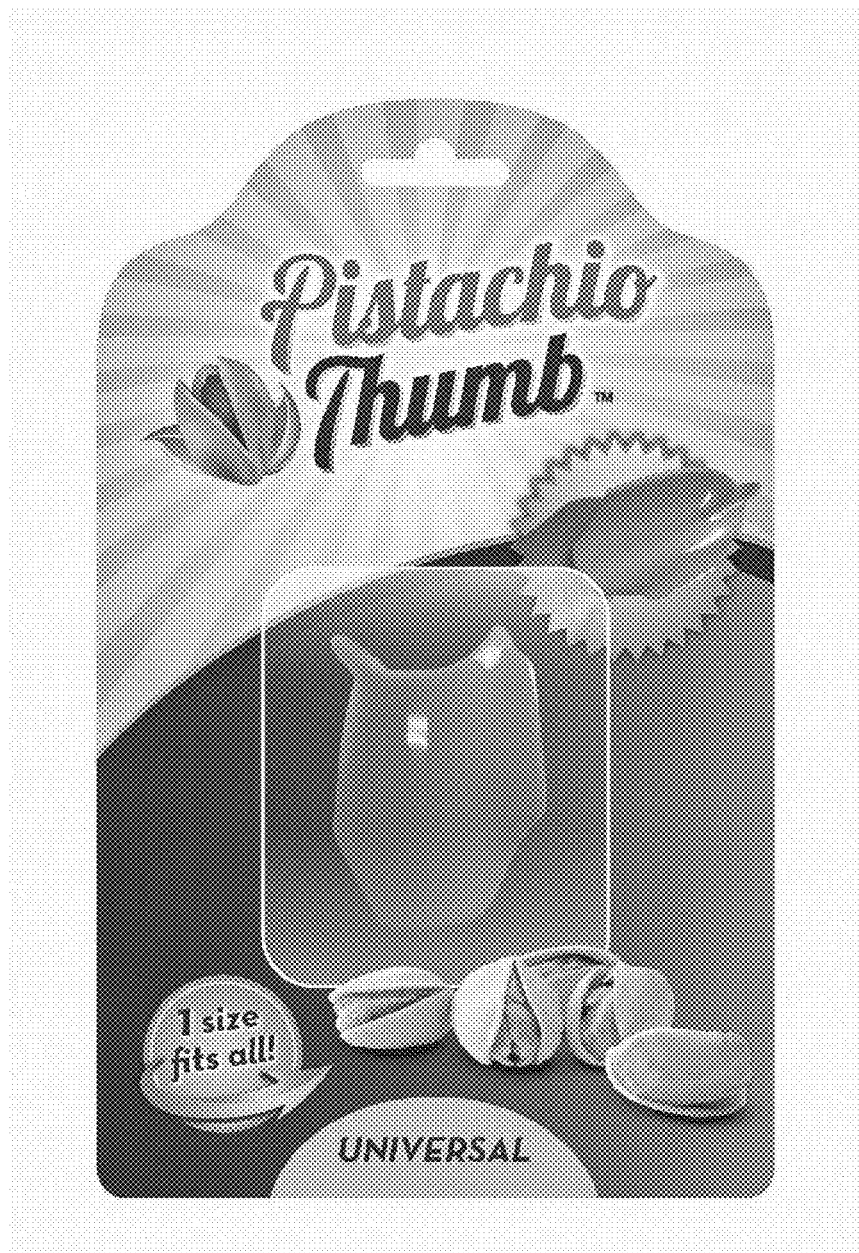
FIGS. 16A, 16B, 16C, and 16D show various examples of nut opening devices, packaging, and instructions for use.
Figure 16B:

FIG. 16A shows an example in which a "Universal" sized nut opener device can be individually packaged, such as within a transparent plastic blister pack mounted upon a cardboard backing, the backside of which can include printed textual and graphic instructions for use, such as shown in FIG. 16B. This package, in turn, can be included with or within a package or container of culinary nuts, such as pistachios.

Figure 16C:
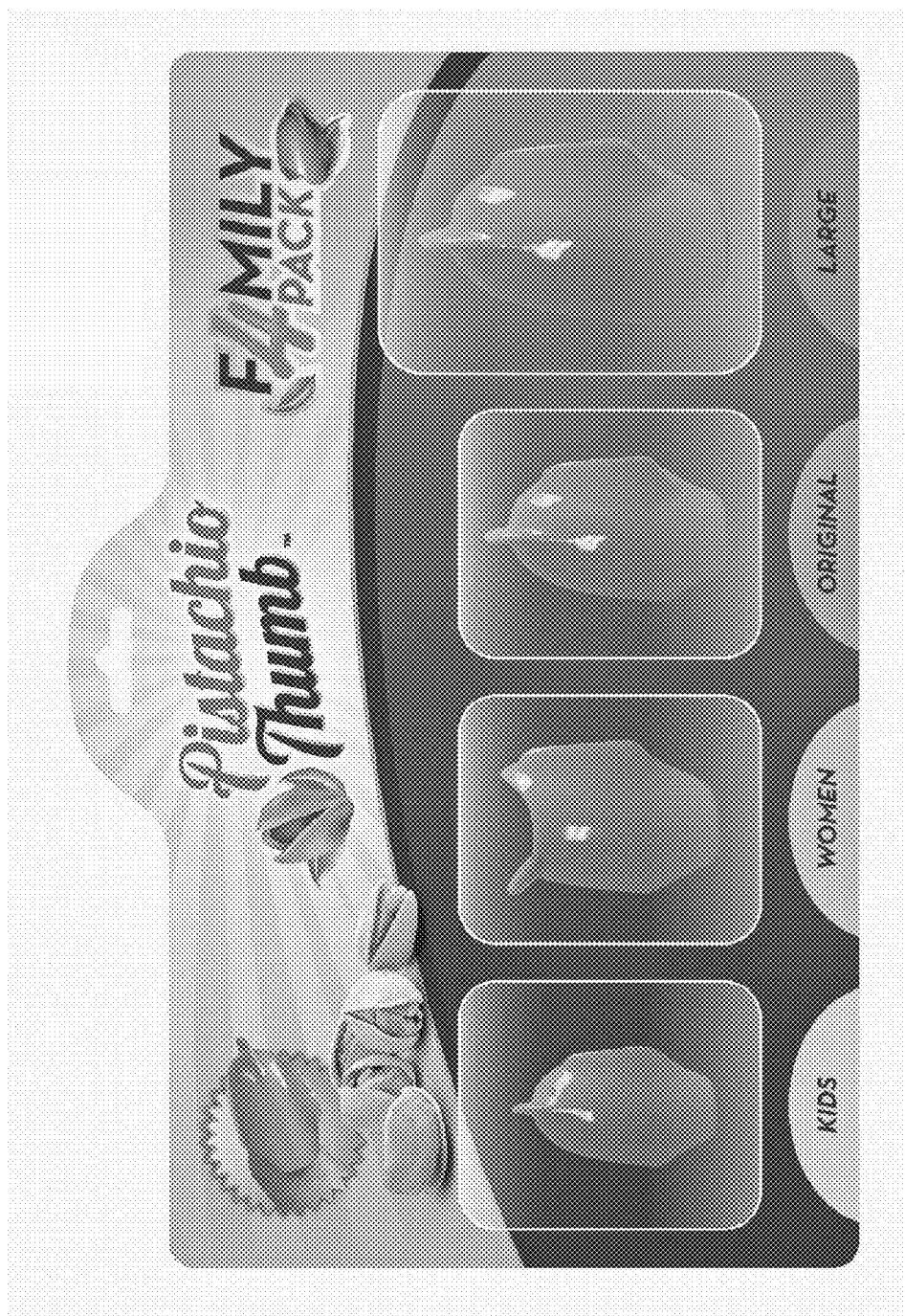
Figure 16D:

FIG. 16C shows an example in which an "Original" sized nut opener device can be packaged with one or more other nut opener devices, such as within a Family 4 Pack, which also can include a kids size nut opener device, a women's sized nut opener device (e.g., with a distal end opening that can accommodate protrusion of a long fingernail or thumbnail), and a large nut opener device, such as can be respectively located within one or more (e.g., respective) transparent plastic blister packs mounted upon a common (e.g., shared) cardboard backing, the backside of which can include printed textual and graphic instructions for use, such as shown in FIG. 16D. This package, in turn, can be included with or within a package or container of culinary nuts, such as pistachios. In an example, each of the kids, women, original, and large size nut opener devices can include a distal opening 900, such as all being configured such as shown in FIGS. 15A-15G, e.g., with the canted distal pick tool 400. For the "women" size nut opener device, dimensions can be (with reference to the letters A-M shown in FIGS. 15A-15G) as follows:

A=0.300 inches=0.762 cm
B=0.750 inches=1.905 cm
C=0.980 inches=2.489 cm
D=0.411 inches=1.044 cm
E=0.205 inches=0.521 cm
F=0.426 inches=1.082 cm
G=0.700 inches=1.778 cm
H=0.651 inches=1.654 cm
I=0.315 inches=0.800 cm
J=0.186 inches=0.472 cm
K=0.226 inches=0.574 cm
L=0.670 inches=1.702 cm
M=0.473 inches=1.201 cm In an example, the kid size nut opener device can be scaled to 80% of the women size nut opener device, the original size device can be scaled to 111% of the women sized nut opener device, and the large size device can be scaled to 120% of the women sized nut opener device.

Non-Limiting Examples or Non-Limiting Statements of Aspects of the Invention

Example 1 can include or use subject matter (such as an apparatus, a method, a means for performing acts, or a device readable medium including instructions that, when performed by the device, can cause the device to perform acts), such as can include or use a culinary nut opening device, comprising: a mount, sized and shaped to conformably, securely, and removably receive a finger or a thumb of a human user. The nut opening device can include a first tool. The first tool can extend from and can be coupled to the mount. The first tool can include a pick portion that is sized and shaped to fit at least partially within an opening of a culinary nut. The pick portion can have sufficient stiffness to allow the culinary nut to be pried open by the user when the mount is placed onto the user's finger or thumb and when the culinary nut is secured.

Example 2 can include or use, or can optionally be combined with the subject matter of Example 2 such that the pick portion can include or use a blunt outer edge that can be configured to avoid damaging nutmeat of the culinary nut during prying.

Example 3 can include or use, or can optionally be combined with the subject matter of Examples 1 or 2, such that the pick portion can include or use a width dimension that can be greater than a thickness dimension.

Example 4 can include or use, or can optionally be combined with the subject matter of any of Examples 1-3 to include or use a second tool that can extend ventrally, dorsally, or laterally outward from and coupled to a side of the mount. The second tool can include a second pick portion that can be sized and shaped or otherwise configured to fit at least partially within an opening of a culinary nut. The pick portion of the second tool can have sufficient stiffness to allow the culinary nut to be pried open by the user when the mount is placed onto the user's finger or thumb and the culinary nut is secured.

Example 5 can include or use, or can optionally be combined with the subject matter of any of Examples 1-5 such that the second tool can define an arcuate plane.

Example 6 can include or use, or can optionally be combined with the subject matter of any of Examples 1-6 to include or use a third tool that can extend ventrally, dorsally, or laterally outward from and coupled to a side of the mount. The third tool can include a third pick portion that can be sized and shaped to fit at least partially within an opening of a culinary nut. The third tool can have sufficient stiffness to allow the culinary nut to be pried open by the user when the mount is placed onto the user's finger or thumb and the culinary nut is secured.

Example 7 can include or use, or can optionally be combined with the subject matter of any of Examples 1-6, such that the first tool can extend from a distal end of the mount.

Example 8 can include or use, or can optionally be combined with the subject matter of any of Examples 1-7 such that the mount can include an open proximal end and an at least substantially closed distal end, the substantially closed distal end configured to inhibit or prevent advancement of the user's finger or thumb through the mount.

Example 9 can include or use, or can optionally be combined with the subject matter of any of Examples 1-7 such that the mount includes an open proximal end and an at least substantially open distal end, the substantially open distal end configured to allow advancement of at least a portion of the user's finger or thumb through the substantially open distal end.

Example 10 can include or use, or can optionally be combined with the subject matter of any of Examples 1-9 such that the first tool can extend from a distal end of the mount at a dorsally or ventrally canted angle from a central longitudinal axis of the user's finger or thumb.

Example 11 can include or use, or can optionally be combined with the subject matter of any of Examples 1-10 such that the mount can include a size indication or a logo on an outer surface of the mount.

Example 12 can include or use, or can optionally be combined with the subject matter of any of Examples 1-11 such that the mount can include a cross-sectional size and shape that can be configured to inhibit or prevent rotation of the mount about the finger or thumb of the user.

Example 13 can include or use, or can optionally be combined with the subject matter of any of Examples 1-12 such that the mount can include one or more air vent openings.

Example 14 can include or use, or can optionally be combined with the subject matter of any of Examples 1-13 such that the mount can be configured such that a cross-sectional size of the mount can be adjustable.

Example 15 can include or use, or can optionally be combined with the subject matter of any of Examples 1-14 such that at least one of the mount or tool can be sized, shaped, or otherwise configured to accommodate or avoid impinging upon a fingernail or a thumbnail of the user that extends beyond a distal tip of the finger or thumb of the user.

Example 16 can include or use, or can optionally be combined with the subject matter of any of Examples 1-15 to optionally further include a lining that can be coupled to an inner surface of the mount.

Example 17 can include or use, or can optionally be combined with the subject matter of any of Examples 1-17 such that the mount can extend from an open proximal end to a distal end limiting or inhibiting advancement of the user's finger or thumb through the mount. The first tool can extend distally outward from and coupled to a surface of the mount. The first tool can include a first pick portion that can be sized, shaped, or otherwise configured to fit at least partially within an opening of a culinary nut. The first tool can have sufficient stiffness to allow the culinary nut to be pried open by the user. A second tool can extend ventrally or laterally outward from and longitudinally along a surface of the mount. The second tool can include a second pick portion that can be sized, shaped, or otherwise configured to fit at least partially within an opening of a culinary nut. The second tool can have sufficient stiffness to allow the culinary nut to be pried open by the user. A third tool can extend ventrally or laterally outward from and longitudinally along a surface of the mount. The third tool can include a third pick portion that can be sized, shaped, or otherwise configured to fit at least partially within an opening of a culinary nut. The third tool can have sufficient stiffness to allow the culinary nut to be pried open by the user.

Example 18 can include or use, or can optionally be combined with the subject matter of any of Examples 1-17 such that the first, second, and third pick portions can respectively include a blunt outer edge that can be configured to avoid damaging nutmeat of the culinary nut during a prying process.

Example 19 can include or use, or can optionally be combined with the subject matter of any of Examples 1-18 such that the distal end of the mount can define an opening configured to allow a portion of the user's finger, thumb, fingernail, or thumbnail to protrude out therefrom. The first tool can include a first pick portion that can be configured to extend outward at a ventrally canted angle from a longitudinal axis of a portion of the user's finger or thumb that can be situated within the mount.

Example 20 can include or use, or can optionally be combined with the subject matter of any of Examples 1-19 to include or use the nut opening device being in combination with a kit, package, or container comprising a plurality of culinary nuts.

Example 21 can include or use, or can optionally be combined with the subject matter of any of Examples 1-20 to include or use the nut opening device being in combination with a kit, package, or container comprising at least one other nut opening device.

Example 22 can include or use, or can optionally be combined with the subject matter of Example 21 such that the at least one other nut opening device can be sized, shaped, or otherwise configured differently.

Example 23 can include or use, or can optionally be combined with the subject matter of any of Examples 1-22 such that the nut opener device can be included in or with a kit, package, or container that can include a child size nut opening device, an adult male size nut opening device, and an adult female size nut opening device.

Example 24 can include or use, or can optionally be combined with the subject matter of any of Examples 1-23 such that the adult female size nut opening device can include a distal end of the mount defining an opening that can be configured to allow a portion of the user's finger, thumb, fingernail, or thumbnail to protrude out therefrom.

CLOSING NOTES

The above Detailed Description includes references to the accompanying drawings, which form a part of the Detailed Description. The drawings show, by way of illustration, specific embodiments in which the present nut opening devices can be practiced. These embodiments are also referred to herein as "examples."

The above Detailed Description is intended to be illustrative, and not restrictive. For example, the above-described examples (or one or more elements thereof) can be used in combination with each other. Other embodiments can be used, such as by one of ordinary skill in the art upon reviewing the above description. Also, various features or elements can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the present nut opener should be determined with reference to the appended claims, along with the full scope of equivalents to which such claims are entitled.

In the event of inconsistent usages between this document and any document incorporated by reference, the usage in this document controls.

In this document, the terms "a" or "an" are used to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, kit, or process that includes elements in addition to those listed after such a term in a claim are still deemed to fall within the scope of that claim. Moreover, in the following claims, any use of the terms "first," "second," and "third," etc. is not intended to impose numerical requirements on their objects, but is rather included for label purposes.

The Abstract is provided to comply with 37 C.F.R. §1.72(b), to allow the reader to quickly ascertain the nature of the technical disclosure. It is submitted with the understanding that it will not be used to interpret or limit the scope or meaning of the claims.

What is claimed is:

1. A culinary nut opening device, comprising:
    a mount, sized and shaped to conformably, securely, and removably receive a finger or a thumb of a human user, wherein a distal end of the mount defines an opening configured to allow a portion of the user's finger, thumb, fingernail, or thumbnail to protrude out therefrom; and
    a first tool (400), extending from and coupled to the mount, the first tool including a first pick portion that is sized and shaped to fit at least partially within an opening of a culinary nut and having sufficient stiffness to allow the culinary nut to be pried open by the user when the mount is placed onto the user's finger or thumb and the culinary nut is secured, wherein the first pick portion provides a blunt distal tip that is configured to avoid damaging nutmeat of the culinary nut during prying;

a second tool (500), extending and pointing ventrally outward from and longitudinally along a ventral surface of the mount, and projecting ventrally from a first location on the ventral surface of the mount that is contained within an outline of the ventral surface of the mount, the second tool including a second pick portion that is sized and shaped to fit at least partially within an opening of a culinary nut and having sufficient stiffness to allow the culinary nut to be pried open by the user when the mount is placed onto the user's finger or thumb and the culinary nut is secured; and a third tool (500), extending and pointing ventrally outward from and longitudinally along the ventral surface of the mount, and projecting ventrally from a second location on the ventral surface of the mount that is contained within the outline of the ventral surface of the mount, the third tool including a third pick portion that is sized and shaped to fit at least partially within an opening of a culinary nut and having sufficient stiffness to allow the culinary nut to be pried open by the user when the mount is placed onto the user's finger or thumb and the culinary nut is secured.

2. The nut opening device of claim 1, wherein the first, second, and third pick portions include a blunt outer edge that is configured to avoid damaging nutmeat of the culinary nut during prying.

3. The nut opening device of claim 1, wherein the first, second, and third pick portions include a width dimension that is greater than a thickness dimension.

4. The nut opening device of claim 1, wherein the second and third pick portions respectively define an arcuate plane.

5. The nut opening device of claim 4, wherein the second and third pick portions respectively longitudinally extend arcuately in the proximal-distal direction of the user's finger or thumb.

6. The nut opening device claim 1, wherein the first pick portion extends from the distal end of the mount.

7. The nut opening device of claim 1, wherein the mount includes an open proximal end (300) and an at least partially closed distal end (200), the at least partially closed distal end configured to inhibit advancement of the user's finger or thumb through the mount.

8. The nut opening device of claim 1, wherein the mount includes an open proximal end (300) and the distal end of the mount is an at least substantially open distal end (900), the substantially open distal end configured to allow advancement of at least a portion of the user's finger or thumb through the substantially open distal end.

9. The nut opening device of claim 1, wherein the first pick portion extends from the distal end of the mount defining a plane that is at a dorsally or ventrally canted angle with respect to a central longitudinal axis of the mount.

10. The nut opening device of claim 1, wherein the mount includes a size indication or logo on an outer surface of the mount.

11. The nut opening device of claim 1, wherein the mount includes a cross-sectional size and shape configured to inhibit rotation of the mount about the finger or thumb of the user.

12. The nut opening device of claim 1, wherein the mount includes one or more air vent openings.

13. The nut opening device of claim 1, wherein the mount is configured such that a cross-sectional size of the mount is adjustable.

14. The nut opening device of claim 1, wherein at least one of the mount or the first pick portion of the first tool is sized, shaped, or otherwise configured to accommodate or avoid impinging upon a fingernail or a thumbnail of the user that extends beyond a distal tip of the finger or thumb of the user.

15. The nut opening device of claim 1, further comprising a lining coupled to an inner surface of the mount.

16. The culinary nut opening device of claim 1, comprising the mount extending from an open proximal end to the distal end limiting or inhibiting advancement of the user's finger or thumb through the mount.

17. The nut opening device of claim 1, wherein the first, second, and third pick portions respectively include a blunt outer edge that avoids damaging nutmeat of the culinary nut during a prying process.

18. The nut opening device of claim 1, wherein the first pick portion is configured to extend outward at a ventrally canted angle with respect to a longitudinal axis of the mount.

19. The nut opening device of claim 1, in combination with a kit, package, or container comprising a plurality of culinary nuts.

20. The nut opening device of claim 1, in combination with a kit, package, or container comprising at least one other nut opening device.

21. The nut opening device of claim 20, wherein the at least one other nut opening device is sized, shaped, or otherwise configured differently.

22. The nut opening device of claim 20, wherein the kit, package, or container includes a child size nut opening device, an adult male size nut opening device, and an adult female size nut opening device.

23. The nut opening device of claim 22, wherein the adult female size nut opening device includes a distal end of the mount defines an opening configured to allow a portion of the user's finger, thumb, fingernail, or thumbnail to protrude out therefrom.

24. A culinary nut opening device, comprising:

a mount, sized and shaped to conformably, securely, and removably receive a finger or a thumb of a human user, wherein a distal end of the mount defines an opening configured to allow a portion of the user's finger, thumb, fingernail, or thumbnail to protrude out therefrom; and a first tool (400), extending from and coupled to the mount, the first tool including a first pick portion that is sized and shaped to fit at least partially within an opening of a culinary nut and having sufficient stiffness to allow the culinary nut to be pried open by the user when the mount is placed onto the user's finger or thumb and the culinary nut is secured, wherein the first pick portion provides a blunt distal tip that is configured to avoid damaging nutmeat of the culinary nut during prying;

a second tool (500), extending and pointing ventrally outward from and longitudinally along a ventral surface of the mount, and projecting ventrally from a first location on the ventral surface of the mount that is contained within an outline of the ventral surface of the mount, the second tool including a second pick portion that is sized and shaped to fit at least partially within an opening of a culinary nut and having sufficient stiffness to allow the culinary nut to be pried open by the user when the mount is placed onto the user's finger or thumb and the culinary nut is secured;

a third tool (500), extending ventrally outward from and longitudinally along the ventral surface of the mount, and projecting ventrally from a second location on the ventral surface of the mount that is contained within the outline of the ventral surface of the mount, the third tool including a third pick portion that is sized and shaped to fit at least partially within an opening of a culinary nut and having sufficient stiffness to allow the culinary nut to be pried open by the user when the mount is placed onto the user's finger or thumb and the culinary nut is secured; and wherein the second and third pick portions respectively define an arcuate plane.

* * * * *